United States Patent
Woods et al.

(10) Patent No.: US 9,085,384 B2
(45) Date of Patent: Jul. 21, 2015

(54) LINER-FREE LABEL AND SYSTEMS

(75) Inventors: Michael C. Woods, Providence, RI (US); Benjamin D. Lux, Providence, RI (US); Ryan Lei Han Chan, Los Angeles, CA (US); Benjamin D. Zlotoff, Boston, MA (US); Owen F. Miller, Alstead, NH (US); Max B. Winograd, West Roxbury, MA (US); John D. Cheasty, Boston, MA (US)

(73) Assignee: NuLabel Technologies, Inc., East Providence, RI (US)

( * ) Notice: Subject to any disclaimer, the term of this patent is extended or adjusted under 35 U.S.C. 154(b) by 642 days.

(21) Appl. No.: 12/814,980

(22) Filed: Jun. 14, 2010

(65) Prior Publication Data

US 2011/0033698 A1 Feb. 10, 2011

Related U.S. Application Data

(60) Provisional application No. 61/186,846, filed on Jun. 14, 2009, provisional application No. 61/249,155, filed on Oct. 6, 2009, provisional application No. 61/290,044, filed on Dec. 24, 2009.

(51) Int. Cl.
*B65C 9/00* (2006.01)
*B65C 9/22* (2006.01)
*C09D 11/54* (2014.01)

(52) U.S. Cl.
CPC ............... *B65C 9/2213* (2013.01); *C09D 11/54* (2013.01); *Y10T 428/2813* (2015.01)

(58) Field of Classification Search
CPC .. B65C 9/2204; B65C 9/2213; B65C 9/2217; B65C 9/2221; Y10T 428/2813; C09D 11/54

USPC .................................. 156/356, 578; 118/695
See application file for complete search history.

(56) References Cited

U.S. PATENT DOCUMENTS

| | | | |
|---|---|---|---|
| 830,400 | A | 9/1906 | Zellen |
| 868,977 | A | 10/1907 | Elliott |
| 1,726,089 | A | 8/1929 | Uttz, Sr. |
| 1,860,668 | A | 5/1932 | Gillet |
| 1,921,626 | A | 8/1933 | Link |

(Continued)

FOREIGN PATENT DOCUMENTS

| | | |
|---|---|---|
| CN | 1213906 | 8/2005 |
| CN | 1221435 | 10/2005 |

(Continued)

OTHER PUBLICATIONS

Chinese Office Action, with English translation, CN Application No. 201080036206.X, mailed Aug. 5, 2014, 11 pages.

(Continued)

*Primary Examiner* — George Koch
(74) *Attorney, Agent, or Firm* — Fish & Richardson P.C.

(57) ABSTRACT

The invention relates to a liner-free label activator, adapted to be joined to another piece of equipment, such as a thermal printer. The activator has a housing including a reservoir for containing a solvent and a pump connected to the reservoir. The activator also has an applicator connected to the pump for applying solvent to a liner-free label passing thereby, an activator control system to connect to a control system of the printer, and structure for connecting the housing to the printer.

15 Claims, 25 Drawing Sheets

(56) References Cited

U.S. PATENT DOCUMENTS

| | | |
|---|---|---|
| 2,138,474 A | 11/1938 | Gautier |
| 2,178,979 A | 11/1939 | Von Hofe et al. |
| 2,294,670 A | 9/1942 | Krueger |
| 2,348,220 A | 5/1944 | Kline |
| 2,352,149 A | 6/1944 | Gautier |
| 2,362,755 A | 11/1944 | Krueger |
| 2,506,673 A | 5/1950 | Krueger |
| 2,565,451 A | 8/1951 | Hoitt |
| 2,614,523 A | 10/1952 | Havemann et al. |
| 2,757,730 A | 8/1956 | Hempel |
| 2,768,096 A | 10/1956 | Toulmin, Jr. |
| 2,861,539 A | 11/1958 | Bergmark |
| 2,970,536 A | 2/1961 | Bach |
| 2,976,178 A | 3/1961 | Pahl et al. |
| 3,037,477 A | 6/1962 | Krueger et al. |
| 3,208,428 A | 9/1965 | Doyle |
| 3,343,978 A | 9/1967 | Engelbach |
| 3,865,767 A | 2/1975 | Boberg |
| 3,955,481 A | 5/1976 | Heitmann |
| 4,121,536 A | 10/1978 | Chamberlain et al. |
| 4,380,210 A | 4/1983 | Auerbach |
| 4,386,576 A | 6/1983 | Johnson |
| 4,538,541 A | 9/1985 | Zimmer |
| 4,707,211 A | 11/1987 | Shibata |
| 4,784,714 A | 11/1988 | Shibata |
| 4,891,249 A | 1/1990 | McIntyre |
| 5,188,271 A | 2/1993 | Dannatt |
| 5,242,650 A | 9/1993 | Rackovan et al. |
| 5,321,933 A | 6/1994 | Seifert et al. |
| 5,354,588 A | 10/1994 | Mitchell et al. |
| 5,392,704 A | 2/1995 | Silverberg et al. |
| 5,415,484 A | 5/1995 | Gallagher et al. |
| 5,548,942 A | 8/1996 | Zajec |
| 5,560,293 A | 10/1996 | Boreali et al. |
| 5,569,327 A | 10/1996 | Paradis et al. |
| 5,625,006 A | 4/1997 | Callahan, Jr. et al. |
| 5,725,320 A | 3/1998 | Austin et al. |
| 5,768,991 A | 6/1998 | Cless et al. |
| 5,846,358 A | 12/1998 | Nagamoto et al. |
| 5,969,069 A | 10/1999 | Su et al. |
| 6,037,009 A | 3/2000 | Clare et al. |
| 6,080,261 A | 6/2000 | Popat et al. |
| 6,090,483 A | 7/2000 | Kume et al. |
| 6,206,071 B1 | 3/2001 | Majkrzak et al. |
| 6,210,517 B1 | 4/2001 | Eadara et al. |
| 6,294,038 B1 | 9/2001 | Majkrzak |
| 6,298,894 B1 | 10/2001 | Nagamoto et al. |
| 6,306,242 B1 | 10/2001 | Dronzek |
| 6,423,255 B1 | 7/2002 | Hoechsmann et al. |
| 6,432,528 B1 | 8/2002 | Faust et al. |
| 6,491,080 B2 | 12/2002 | Tasma |
| 6,531,024 B1 | 3/2003 | Braun |
| 6,824,839 B1 | 11/2004 | Popat et al. |
| 7,090,740 B2 | 8/2006 | Dronzek |
| 7,101,100 B2 | 9/2006 | Hoshino et al. |
| 7,173,642 B2 | 2/2007 | Nureki |
| 7,365,763 B2 | 4/2008 | Takahashi et al. |
| 2002/0029855 A1 | 3/2002 | Vasilakes et al. |
| 2003/0047275 A1 | 3/2003 | Tasma |
| 2003/0089452 A1 | 5/2003 | Hansen et al. |
| 2005/0150449 A1* | 7/2005 | Matsunaga et al. ........... 118/300 |
| 2007/0074809 A1 | 4/2007 | Phillips |
| 2007/0119542 A1 | 5/2007 | Williams et al. |
| 2009/0120571 A1 | 5/2009 | Rasmussen |
| 2009/0133831 A1 | 5/2009 | Rehkugler et al. |
| 2009/0145558 A1* | 6/2009 | Saluz ............................ 156/530 |

FOREIGN PATENT DOCUMENTS

| | | |
|---|---|---|
| CN | 1052177 | 8/2006 |
| CN | 101228072 | 7/2008 |
| JP | 04-0327126 | 11/1992 |
| JP | 8133249 A | 5/1996 |
| JP | 2001088814 | 4/2001 |
| JP | 2004045874 | 2/2004 |
| JP | 20040514609 | 5/2004 |
| JP | 2009500248 | 1/2009 |

OTHER PUBLICATIONS

Notification of Reasons for Rejection, From the Japanese Patent Office, with English Translation, Japanese Patent Application No. 2012-515214, mailed Apr. 22, 2014, 7 pages.

* cited by examiner

LINER-FREE LABEL AND SYSTEMS

CROSS-REFERENCE TO RELATED APPLICATIONS

This application claims priority to and the benefit of U.S. Provisional Patent Application Ser. No. 61/186,846, filed on Jun. 14, 2009; U.S. Provisional Patent Application Ser. No. 61/249,155, filed on Oct. 6, 2009; and U.S. Provisional Patent Application Ser. No. 61/290,044, filed on Dec. 24, 2009, the disclosures of which are hereby incorporated herein by reference in their entireties.

FIELD OF THE INVENTION

This invention relates generally to liner-free labels and, more specifically, to liner-free label adhesive and activation compositions and activator systems suitable for integration with printers, labeling lines, and other equipment.

BACKGROUND

Adhesive sheet printing and/or labeling often consists of printing on adhesive sheets that include an adhesive agent layer that is constantly and consistently sticky. Many of the adhesive sheets are formed with a removable non-stick layer, comprising both a release coat and a release liner, over the adhesive agent layer to prevent the adhesive agent layer from coming into contact with, first, internal components of a label printer, applicator, or labeler, and second, a printable layer of an adhesive sheet when an adhesive sheet is wound in a form factor such as a roll. In certain instances, the liner layer is disposed of after printing or at the time the label is applied to an article, either manually or by an autonomous process designed for the removal purpose.

In other certain instances, an adhesive label is formed by a sheet, having a printed layer, a release coat, and an adhesive agent layer. The release coat prevents the adhesive agent layer from adhering to the printed layer, but standard printing, labeling, and label applying equipment must be coated with a non-stick material to also prevent the adhesive agent layer of the adhesive label from gumming or jamming the equipment components. Instead of covering an adhesive agent layer with a non-stick material, a printable layer of an adhesive sheet and internal components of a label printer are coated with a non-stick material to resist the adhesive agent layer of the adhesive sheet that is constantly and consistently sticky. Certain adhesive labels have been developed having a printed layer, a sheet, and an adhesive agent layer that can be made sticky by an activator prior to or after printing/applying an image, but many of these still optimally require a non-stick coating to avoid the gumming problem discussed above, such as the invention disclosed in U.S. Pat. No. 6,298,894 by Nagamoto et al. that utilizes silicone oil.

Each of the prior art systems presents different drawbacks. A non-stick liner layer is typically non-recyclable and not re-usable, thereby generating waste for every such label that is used. Coating components with non-stick material increases the costs of the system and may not entirely prevent gumming of the system, that is likely to occur when an adhesive residue adheres to a component.

It is therefore desirable to eliminate the need for an adhesive sheet to be formed with a non-stick liner layer or for components to be coated with non-stick material.

SUMMARY OF THE INVENTION

Generally, the invention relates to systems, methods, and compositions for making an adhesive agent layer of a liner-free or linerless adhesive sheet or label. The layer is activated and made sticky only after the sheet has exited a label printer or is ready to be adhered to an article. By ensuring an adhesive agent layer of a liner-free or linerless adhesive sheet becomes adhesive only after the sheet has exited a label printer, label applicator, or other labeling equipment, the need for a non-stick material coating on the internal components of a label printer, label applicator, other labeling equipment, and on a printable layer of an adhesive sheet is eliminated.

The advantages of the present invention include, without limitation, that a solvent-sensitive adhesive agent layer of a solvent-sensitive adhesive sheet can now become adhesive after exiting a solvent activation apparatus. Label printers, label applicators, and other labeling equipment connected physically and electronically to the present invention do not require a non-stick material coating of internal printer components to prevent adhesive exposure, because a solvent-sensitive adhesive agent layer of a solvent-sensitive adhesive sheet is not rendered tacky until it passes through an activation site contained within a solvent activation apparatus. By enabling label printers and other label handling equipment to support a solvent-sensitive adhesive sheet, adhesive sheets with a release liner and the need to coat components and adhesive sheets with a non-stick material are no longer necessary. And further, in certain instances, the solvent-sensitive adhesive agent layer may be rendered tacky without connecting the solvent activation apparatus electronically or physically to a printer or other equipment.

In one aspect, the invention relates to a liner-free label activator adapted to be joined to another piece of equipment, the activator having a housing including a reservoir adapted to contain a solvent, a pump coupled to the reservoir, an applicator connected to the pump adapted to apply solvent to a liner-free label passing thereby, an activator control system connectable to a control system of the other piece of equipment, and means for connecting the housing to the other piece of equipment. In one embodiment, the other piece of equipment is a printer. In another embodiment, the other piece of equipment is a pre-printed label applicator.

In one embodiment of the above aspect, the reservoir is formed integrally with the housing. In another embodiment, the reservoir is a cartridge removably attached to the housing. In yet another embodiment, the housing further includes a dock for providing a fluidic sealed connection with the cartridge. In still another embodiment, the dock includes a fastener adapted to secure the cartridge in the housing.

In another embodiment of the above aspect, the pump is a self-priming pump. The pump can be a positive displacement pump. The applicator can be a spray bar and the spray bar may form a plurality of discharge apertures. In one embodiment, the activator control system includes various control components, including a pump control, an air valve control, a liquid valve control, and combinations thereof. The housing for the activator can be connected to the other equipment with a quick disconnect or a semi-permanent fastener, such as a bolt, screw, etc.

In one embodiment of the above aspect, the activator includes a liquid valve coupled to and disposed between the pump and the applicator. The liquid valve may normally be closed and adapted to be opened when a label passes by the applicator. The liquid valve can be a solenoid valve.

In still another embodiment of the above aspect, the activator has a check valve and a pressurization chamber connected to and located between the pump and the applicator. In this embodiment, the check valve can be configured to prevent solvent from flowing from the pressurization chamber to the pump, so that the pressurization chamber can store solvent under pressure. In this embodiment, the pressurization chamber can be adapted to maintain a pressurized gaseous volume above a solvent volume. The pressurization chamber may have an air valve to release excess pressurized gas. In another embodiment, the activator is characterized by an absence of structure downstream of the applicator subject to contact with an activated label.

In another aspect, the invention relates to a standalone liner-free label activator having a housing including a reservoir adapted to contain a solvent, a pump connected to the reservoir, an applicator connected to the pump adapted to apply solvent to a liner-free label passing thereby, an activator control system adapted to activate the applicator only when a liner-free label is present, and mechanical means for moving a liner-free label to a location for activation, wherein the mechanical means remain in contact with a liner-free label for at least a part of activation.

In one embodiment of the above aspect, the activator control system is an optical sensor configured to detect presence of a liner-free label. In another embodiment, the activator control system is adapted to determine a size of a liner-free label. In yet another embodiment, the activator control system further is adapted to detect a location of a liner-free label in the standalone liner-free label activator. In still another embodiment of the above aspect, the mechanical moving means are pinch rollers driven by a motor.

In an embodiment of the above aspect, the activator includes a cutting mechanism, that can be adapted to cut a liner-free label from a continuous web of liner-free label stock typically prior to activation. The activator may have a power connection adapted to connect to a power source, to supply power to the applicator, the motor, and any other powered components. In still another embodiment, the activator is characterized by an absence of an activated label contact element downstream of the applicator.

In yet another aspect, the invention relates to a method of manufacturing a liner-free label including the steps of providing a printable layer that may be pre-printed, and mixing a solvent-sensitive adhesive agent layer having at least about 10% by weight of dry solids mixed into an aqueous solution, the dry solids including at least about 50% by weight adhesive. The adhesive may be polyvinyl alcohol, polyvinyl acetate, polychloroprene, polyurethane, ethylene-vinyl acetate, acrylate, polyacrylate, methyl cellulose, deionized water, polyvinylpyrrolidone, polyethylene glycol, glycerin, glycols, urea, citrates, sugars, sorbitol, polyethylene oxide, polyethyloxazoline, gelatin, polyacylamide copolymers, carboxymethyl cellulose, ethyl(hydroxyethyl) cellulose, pectin, casein, polyacrylic acid, alginates, agar, arabic, carrageen, ghatti, guar, karaya, locust bean, tragacanth, xanthenes, and combinations thereof. The adhesive is combined in a liquid phase solvent system having at least about 90% by volume of water. The balance are solvents, such as isopropyl alcohol, ethanol, dimethyl sulfoxide, dimethylformamide, and combinations thereof. The manufacturing method further includes applying the solvent-sensitive adhesive agent layer to the printable layer, and drying the solvent-sensitive adhesive agent layer to a non-tacky state.

In one embodiment of the above aspect, the dry solids mixture has about 95% polyvinyl alcohol and about 5% ethylene-vinyl acetate. In another embodiment, the dry solids mixture has about 94% polyvinyl alcohol and about 6% acrylate (e.g., poly(acrylic acid) such as Carbosperse K-702). In yet another embodiment, the applying step includes applying the solvent-sensitive adhesive agent layer with a gravure cylinder. In a further embodiment, the solvent-sensitive adhesive agent layer has about 18% by weight of the dry solids mixture. In still another embodiment, the applying step includes applying the solvent-sensitive adhesive agent layer with a knife over roll method. In a further embodiment, the solvent-sensitive adhesive agent layer has about 22% by weight of the dry solids mixture. In another embodiment, the applying step includes applying the solvent-sensitive adhesive agent layer with a modified knife over roll method. In a further embodiment, the solvent-sensitive adhesive agent layer includes about 20% by weight of the dry solids mixture.

In still another aspect, the invention relates to a liner-free label manufactured by providing a printable layer that may be pre-printed, and mixing a solvent-sensitive adhesive agent layer having at least about 10% by weight of dry solids mixed into an aqueous solution, the dry solids including at least about 50% by weight adhesive. The adhesive may be polyvinyl alcohol, polyvinyl acetate, polychloroprene, polyurethane, ethylene-vinyl acetate, acrylate, polyacrylate, methyl cellulose, deionized water, polyvinylpyrrolidone, polyethylene glycol, glycerin, glycols, urea, citrates, sugars, sorbitol, polyethylene oxide, polyethyloxazoline, gelatin, polyacylamide copolymers, carboxymethyl cellulose, ethyl(hydroxyethyl) cellulose, pectin, casein, polyacrylic acid, alginates, agar, arabic, carrageen, ghatti, guar, karaya, locust bean, tragacanth, xanthenes, and combinations thereof. The adhesive is combined in a liquid phase solvent system having at least about 90% by volume of water. The balance are solvents, such as isopropyl alcohol, ethanol, dimethyl sulfoxide, dimethylformamide, and combinations thereof. The manufacturing method further includes applying the solvent-sensitive adhesive agent layer to the printable layer, and drying the solvent-sensitive adhesive agent layer to a non-tacky state.

In another aspect, the invention relates to an activation fluid for activating an adhesive layer of a liner-free label, the activation fluid having at least about 93% by weight of water and at least one additive. The additive may be chlorine, 2-bromo-2-nitropropane-1,3-diol, odium o-phenylphenate, diiodomethyl-p-tolylsulfone, methanol, ethanol, isopropanol, N-propanol, and combinations thereof.

In an embodiment of the above aspect, the activation fluid has at least about 1.5% N-propanol. In a further embodiment, the activation fluid has about 3% N-propanol. In another embodiment, the activation fluid has at least about 1% isopropanol.

In yet another aspect, the invention relates to a method of retrofitting a printer with a liner-free label applicator, by attaching a liner-free label applicator to the printer along a label path of the printer.

In still another aspect, the invention relates to a method of operating a liner-free label activator, including the steps of detecting when a liner-free label is in a specified location, calculating a time delay to determine when the liner-free label reaches an activation zone, spraying a solvent on the liner-free label in the activation zone, and discontinuing spraying as the liner-free label leaves the activation zone.

In one embodiment of the above aspect, the method includes the step of activating a pump to maintain solvent in a desired pressure range. In another embodiment, the method includes the steps of detecting presence of solvent in a spray bar and opening a valve to provide solvent to the spray bar when solvent presence is not detected.

In another aspect, the invention relates to a kit including a liner-free label manufactured by providing a printable layer that may be pre-printed, and mixing a solvent-sensitive adhesive agent layer having at least about 10% by weight of dry solids mixed into an aqueous solution mixture, the dry solids including at least about 50% by weight adhesive. The adhesive may be polyvinyl alcohol, polyvinyl acetate, polychloroprene, polyurethane, ethylene-vinyl acetate, acrylate, polyacrylate, methyl cellulose, deionized water, polyvinylpyrrolidone, polyethylene glycol, glycerin, glycols, urea, citrates, sugars, sorbitol, polyethylene oxide, polyethyloxazoline, gelatin, polyacylamide copolymers, carboxymethyl cellulose, ethyl(hydroxyethyl) cellulose, pectin, casein, polyacrylic acid, alginates, agar, arabic, carrageen, ghatti, guar, karaya, locust bean, tragacanth, xanthenes, and combinations thereof. The adhesive is combined in a liquid phase solvent system having at least about 90% by volume of water. The balance are solvents, such as isopropyl alcohol, ethanol, dimethyl sulfoxide, dimethylformamide, and combinations thereof. The label is manufactured by applying the solvent-sensitive adhesive agent layer to the printable layer, and drying the solvent-sensitive adhesive agent layer to a non-tacky state. The kit further includes an activation fluid for activating an adhesive layer of a liner-free label, the activation fluid having at least about 93% by weight of water and at least one additive. The additive may be chlorine, 2-bromo-2-nitropropane-1,3-diol, odium o-phenylphenate, diiodomethyl-p-tolylsulfone, methanol, ethanol, isopropanol, N-propanol, and combinations thereof.

In still another aspect, the invention relates to a cartridge having a chamber at least partially filled with an activation fluid for activating an adhesive layer of a liner-free label, the activation fluid having at least about 93% by weight of water and at least one additive, such as chlorine, 2-bromo-2-nitropropane-1,3-diol, odium o-phenylphenate, diiodomethyl-p-tolylsulfone, methanol, ethanol, isopropanol, N-propanol, and combinations thereof. In one embodiment, the cartridge contains sufficient fluid to activate at least an entire roll of media.

BRIEF DESCRIPTION OF THE FIGURES

Other features and advantages of the present invention, as well as the invention itself, can be more fully understood from the following description of the various embodiments, when read together with the accompanying drawings, in which.

DETAILED DESCRIPTION

Figure 1:
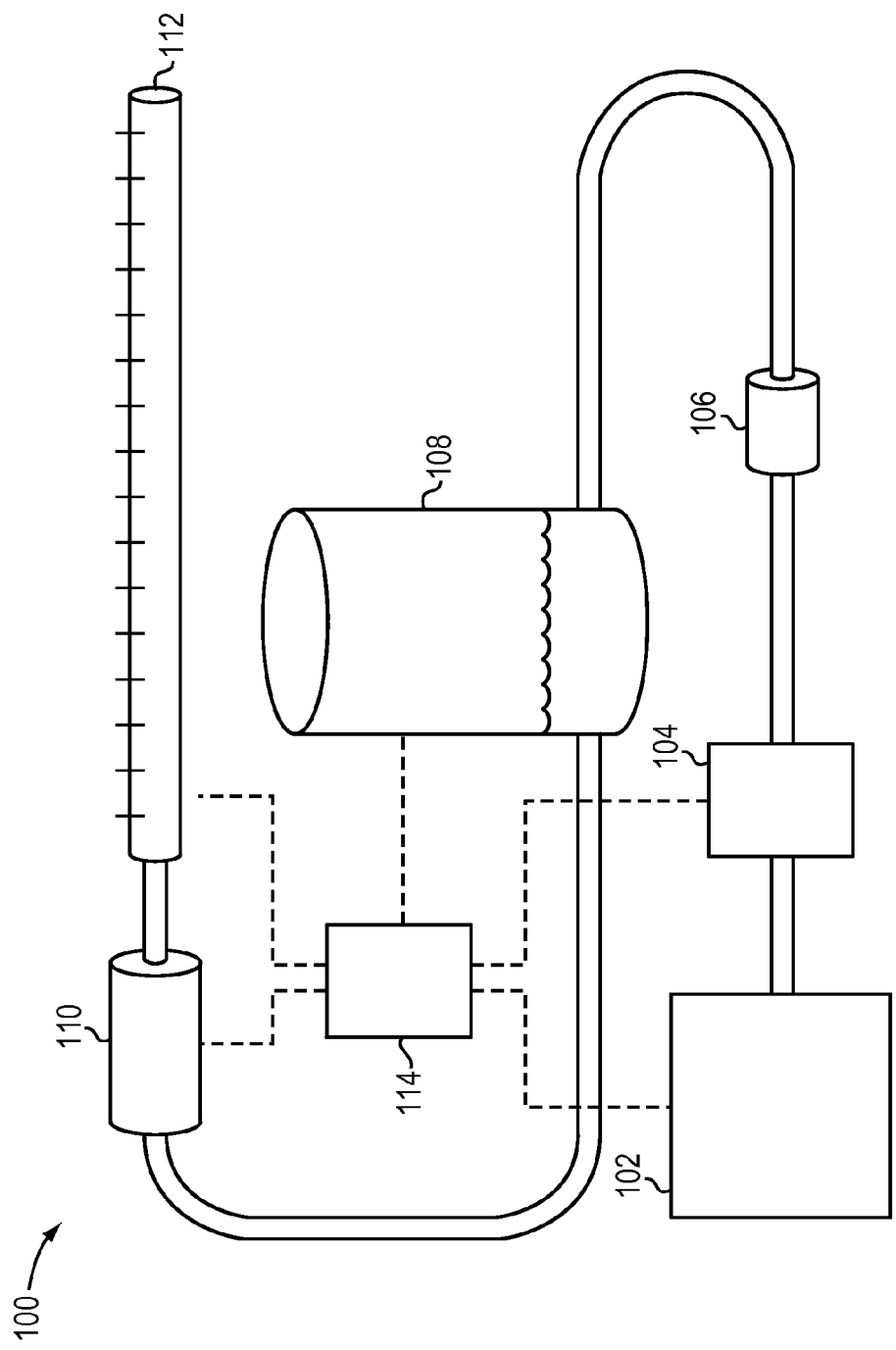
FIG. 1 is a schematic system diagram of a liner-free label activator in accordance with one aspect of the invention.

FIG. 1 depicts a system level view of a liner-free label activator 100. The activator 100 includes a reservoir/cartridge 102, a pump 104, a check valve 106, a pressurization chamber 108, a liquid valve 110, an applicator 112, and an activator control system 114. Each component within the activator 100 is fluidically coupled to at least one other component (except for the activator control system 114) as depicted in FIG. 1. The fluidic connections may be made through any conduit suitable for transporting fluid and allowing for sealed connections at each end, such as flexible tubing or channels formed or machined in other structures, such as an activator housing. Stainless steel tubing (or other rust resistant and rigid materials such as high density polyethylene (HDPE), other hard plastics, certain other metals, etc.) may also be utilized, and lowers the risk of unintended pressure changes because the shape remains constant. The activator control system 114 may be in electronic communication with one or any combination of the following components and/or associated sensors: the pump 104, the pressurization chamber 108, the liquid valve 110, the reservoir 102, and the applicator 112. The particular structure and function of these components will be explained in greater detail below.

Figure 2:
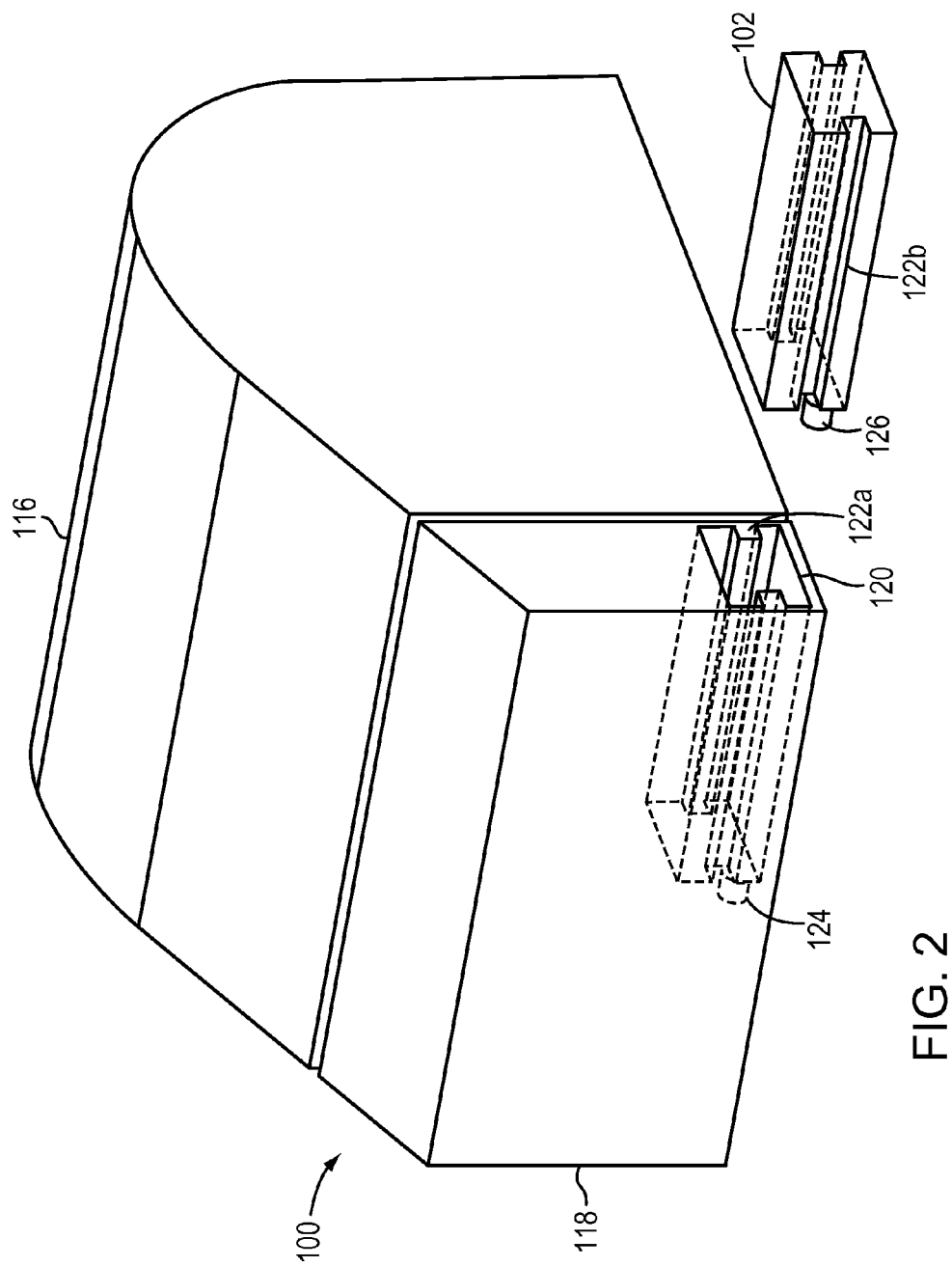
FIG. 2 is a schematic perspective view of a liner-free label activator, a printer, and a reservoir in accordance with one embodiment of the invention.

FIG. 2 depicts one embodiment of the liner-free label activator 100 coupled to a printer 116, such as a thermal printer, ink jet printer, laser printer, etc. The activator 100 includes a housing 118 and the reservoir/cartridge 102. Additional components of the activator 100 are depicted in subsequent figures. The activator 100 may be connected to other non-printer equipment, such as a downstream label applicator and/or an upstream label feed system. The other equipment may provide power, control signals, and/or label feed systems similar to those that may be provided by a printer and suitable for interconnection with the activator 100.

The housing 118 may be mounted to the printer 116, so that a label exiting the printer 116 follows a label path into the housing 118. The housing 118 may be formed to complement the form and/or contour of the printer 116, so as to resemble a natural extension of the printer 116. The housing 118 may define an enclosed space, as depicted in FIG. 2, but may also be any form configured to allow attachment of the activator components to a surface thereof, such as a housing 118' depicted as a wall in FIG. 3A.

In this embodiment, a portion of the housing 118 forms a chamber for receiving the cartridge 102. The chamber defines a dock 120. The dock 120 is configured to hold securely the cartridge 102, with particular mating surfaces and an integral fluidic connection or port. The dock 120 may include one or more sliding surfaces, such as a tongue and groove system, wherein one or more tongues 122a are disposed on sides of the dock 120 and mating grooves 122b are formed in sides of the cartridge 102. The tongues 122a and the grooves 122b are closely dimensioned, so as to provide a close sliding fit. Alternative registration and/or fastening methods may be implemented and are considered within the scope of the invention, such as a clip, a threaded connection, a latch, a magnet, or any other fastening means suitable for the application. Fastening helps ensure that the cartridge 102 will stay securely seated within the dock 120 even if the activator 100 is dropped, tumbled, or otherwise jarred.

The dock 120 includes an inlet 124 configured to interface closely with a cartridge outlet 126 to create a fluidic seal between the cartridge 102 and the dock 120. When the cartridge 102 is firmly seated in the dock 120, an activation fluid in the cartridge 102 may be pumped to other components within the activator 100 without leaks, drips, or other losses.

The cartridge 102 is configured to hold an activation solvent and may be any shape or size configured to contain a fluid and to mate with the dock 120. In another embodiment, the cartridge 102 and the dock 120 are replaced by a reservoir either permanently installed in or formed integrally with the housing 118. Additional forms of the cartridge 102 may be dictated by transportation considerations by, for example, dimensioning the cartridge 102 to fit within the negative space in the middle of a roll of labels, so the cartridge and labels can be efficiently packaged and sold as a consumable set or kit. Each cartridge 102 may be dimensioned to contain a volume of an activation solvent to activate fully at least one roll of associated labels. This allows for a convenient way for an end user to resupply the activator 100 with an accurate and repeatable volume of activation solvent, as needed. The cartridge 102 may be positioned anywhere on the housing 118, as long as it is in fluidic contact with the pump 104 (discussed below).

Figure 3A:
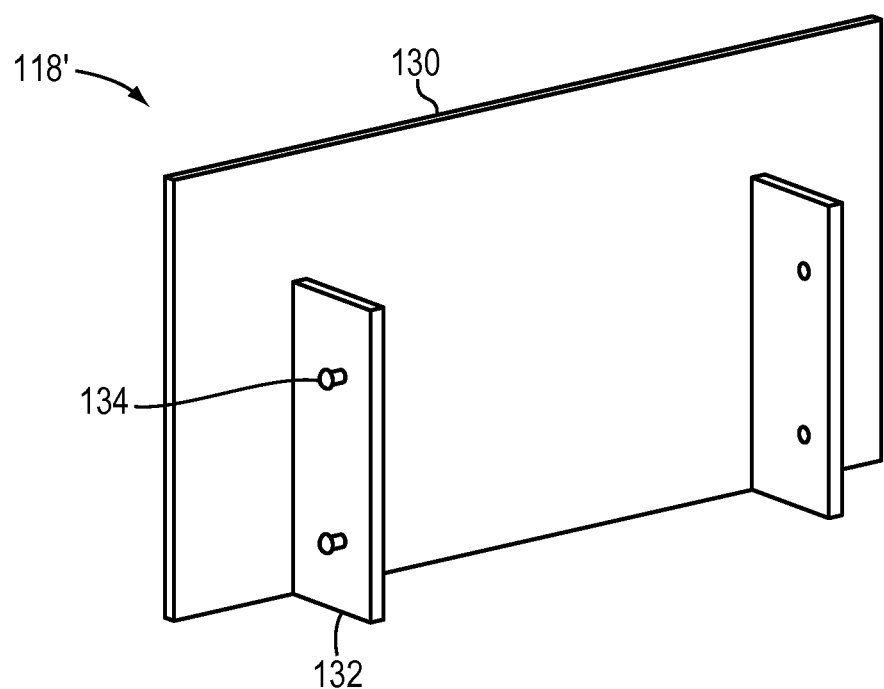
FIG. 3A is a schematic perspective view of a housing in accordance with one embodiment of the invention.
Figure 3B:
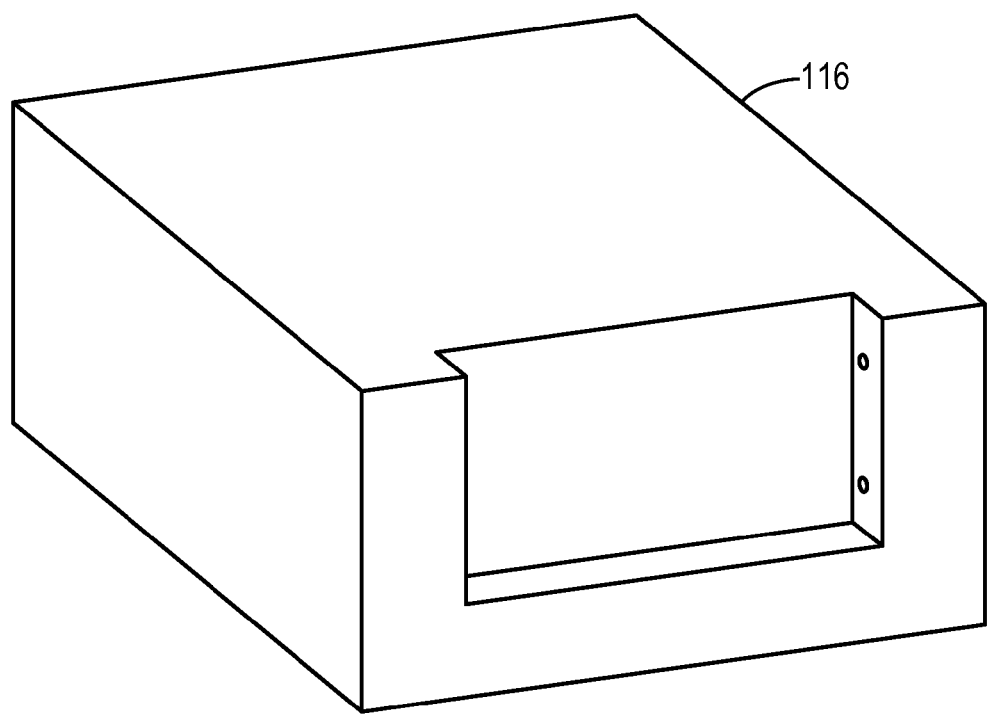
FIG. 3B is a schematic perspective view of a printer representation with an interface for the housing depicted in FIG. 3A.
Figure 3C:
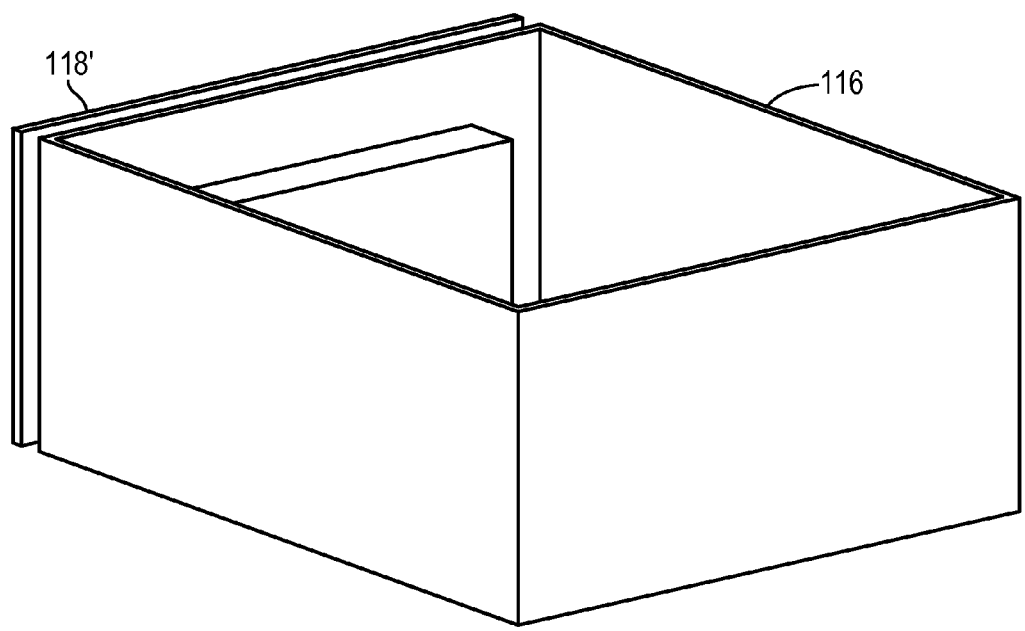
FIG. 3C is a schematic perspective view of the housing depicted in FIG. 3A and the printer representation depicted in FIG. 3B coupled together.
Figure 4A:
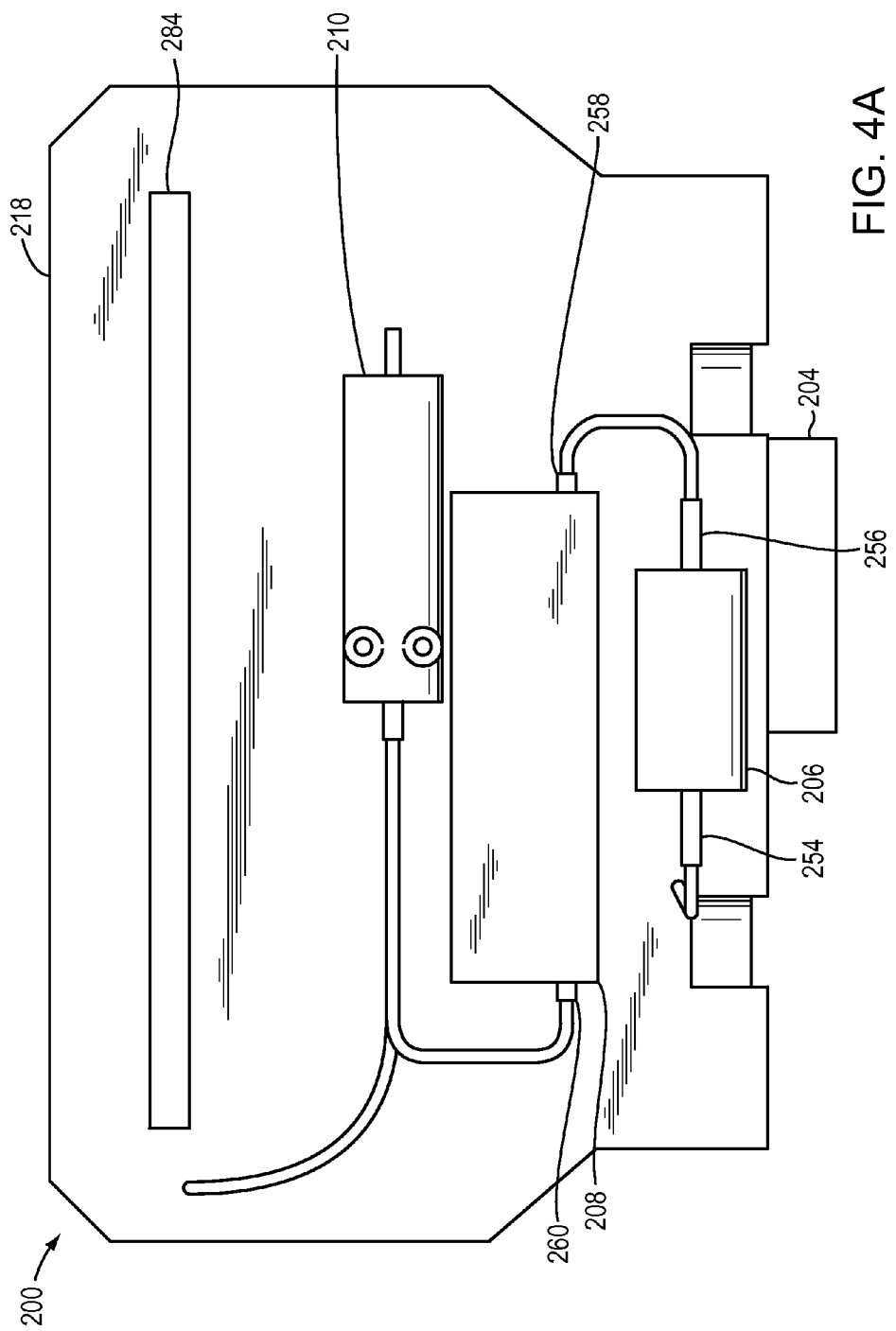
FIGS. 4A-4E are various schematic views of various arrangements of certain components of the liner-free label activator depicted in FIG. 1, in accordance with embodiments of the invention.
Figure 4B:
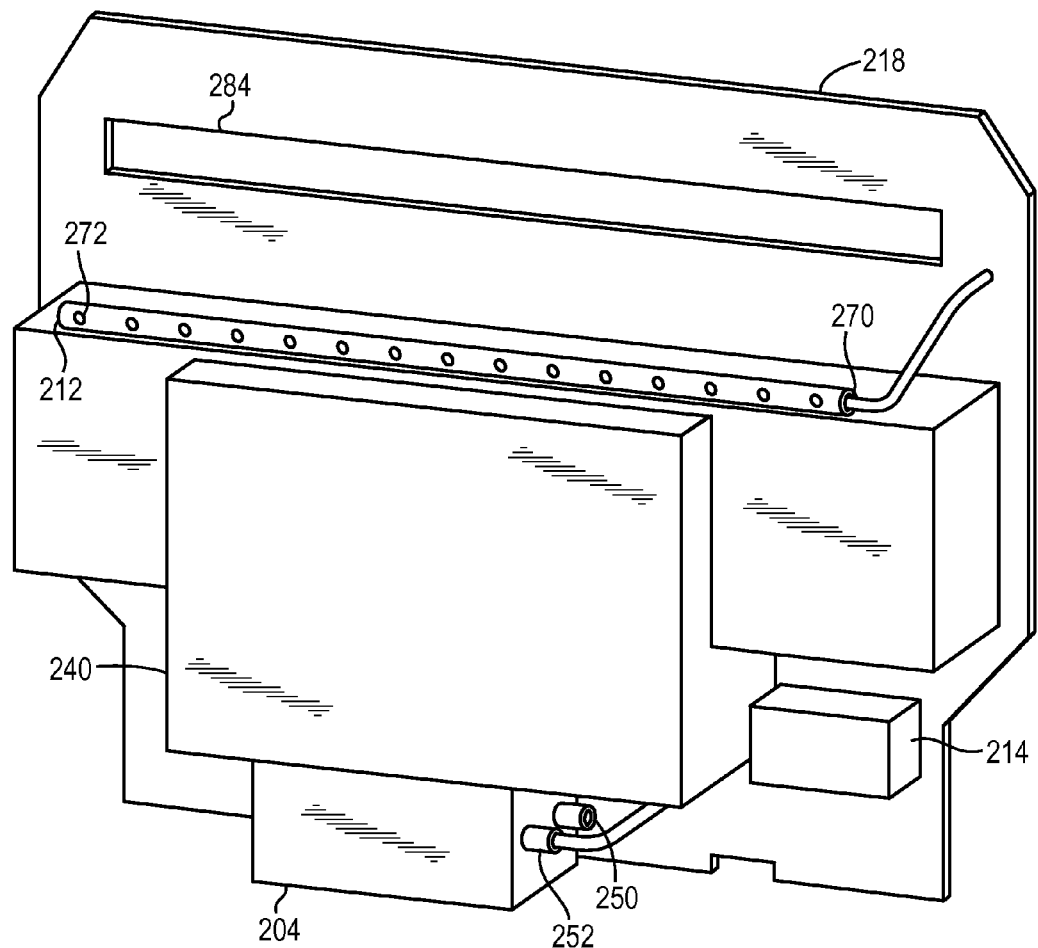
Figure 4C:
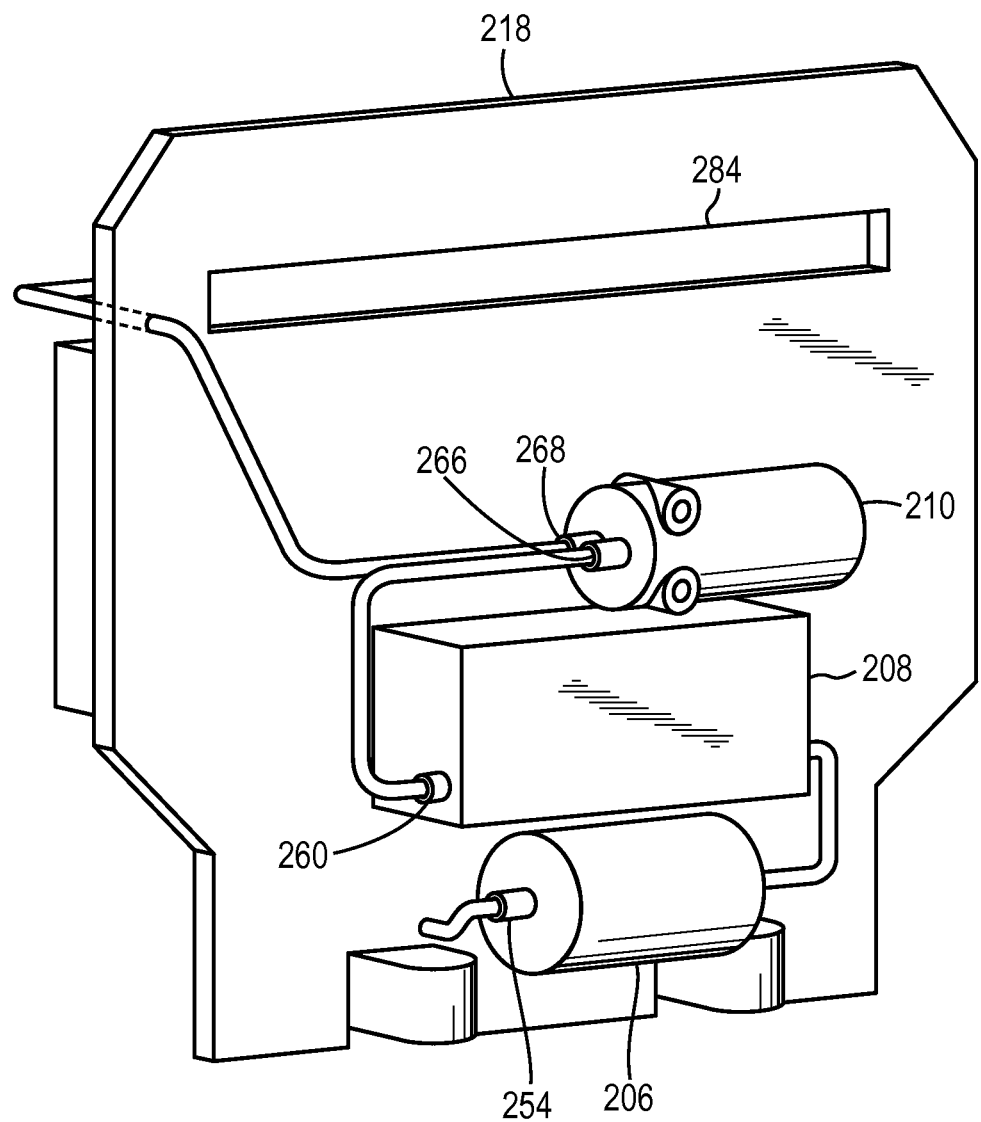
Figure 4D:
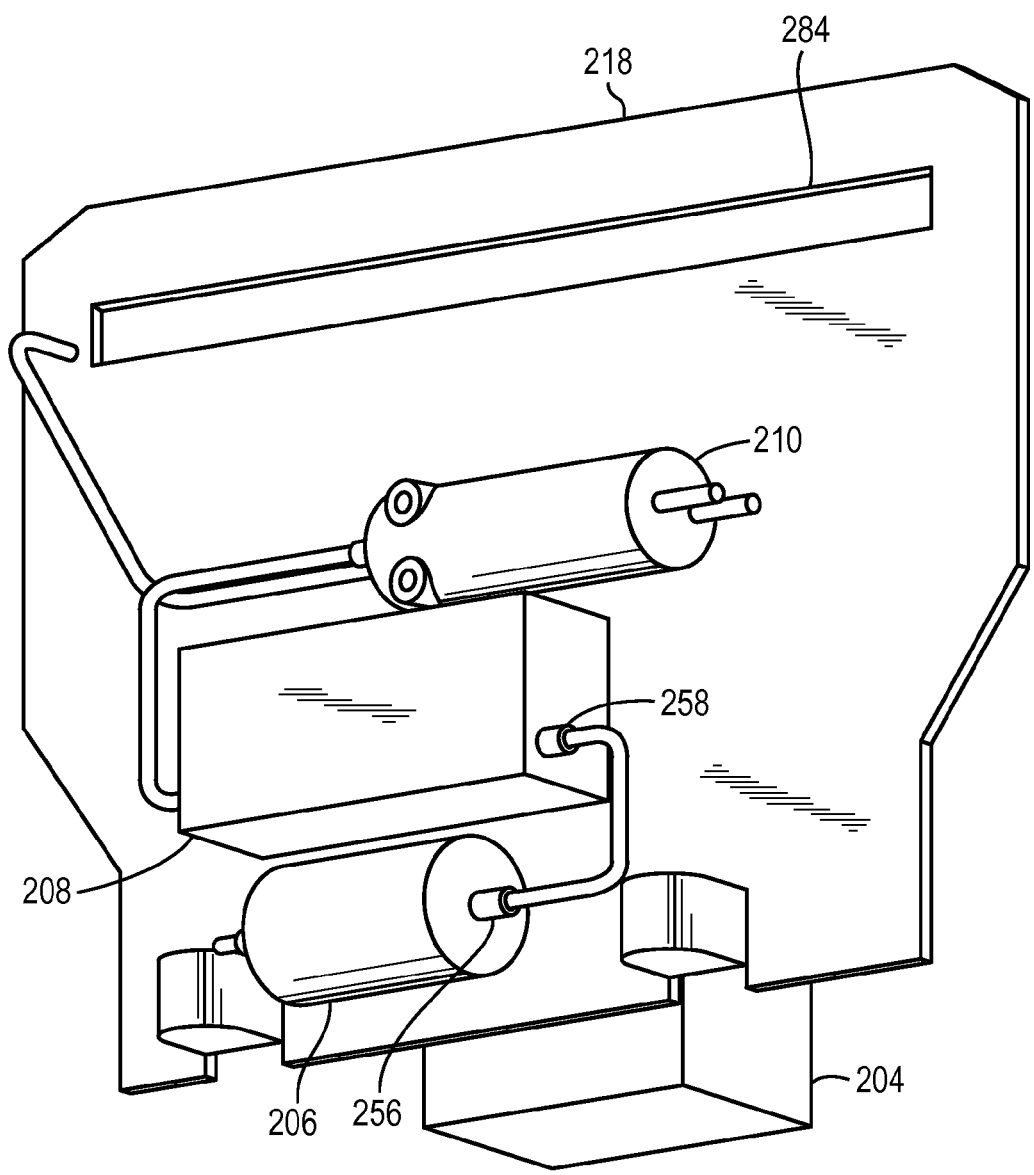
Figure 4E:
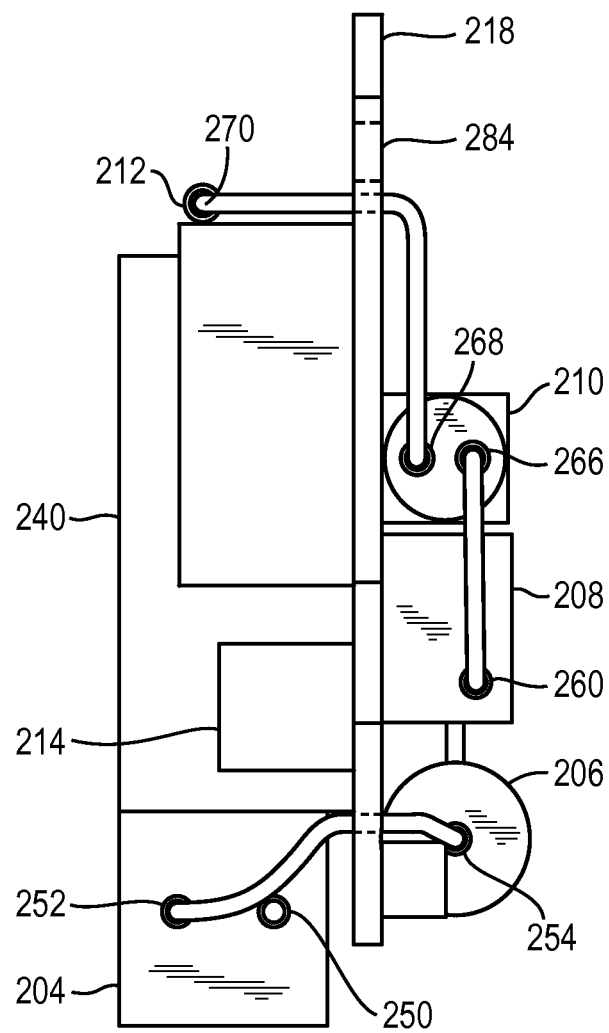

FIGS. 3A-3C depict one embodiment of the connection between the housing 118' and the printer 116. The housing 118' includes a large wall portion 130 with two smaller wall portions 132 or flanges substantially extending perpendicularly from the large wall portion 130. The small wall portions 132 include a coupling structure 134 for connecting the housing 118' to the printer 116. In one embodiment, the coupling 134 may be mounting screws designed to interface with machined holes in the smaller wall portions 134 and in a recess of the printer 116. Several additional fastening means capable of securing the housing 118' to the printer 116 may be used, including semi-permanent fasteners (e.g., nuts and bolts, rivets, etc.) and quick disconnects (e.g., clamps, spring loaded ball-bearings, pin connections, etc.).

FIGS. 4A-4E depict one embodiment of a liner-free label activator 200, based on a wall-mounted component concept. The liner-free label activator 200 includes a housing 218, a reservoir (not shown), a pump 204, an applicator 212, and an activator control system 214. Additional features are also depicted, including a liquid valve 210, a check valve 206, a pressurization chamber 208, and a cutting mechanism 240.

The housing 218 is similar to the housing 118' depicted in FIG. 3A, though without the mounting flanges. The housing 218 is configured to allow each component to be attached to a side thereof. The components may be attached to the housing 218 via fasteners, such as screws, rivets, or other attachment means. Alternative forms for the housing 218 are discussed above, such as an enclosure, as depicted in FIG. 2. The housing defines a label slot 284 configured to accept a label moving therethrough. The label slot 284 may be located above where the applicator 212 is mounted to the housing 218, and may be positioned such that a label passes through the label slot 284 prior to being activated and no sticky part of a label contacts the label slot 284.

The pump 204 is fluidically coupled to a reservoir (e.g., a cartridge) via a pump inlet 250. The pump 204 is used to pressurize an activation solvent in the activator 200 and to create suction to draw activation solvent out of the reservoir. The pump 204 can be one of many different kinds of pumps, including a positive displacement pump. Positive displacement pumps have an ability to self-prime and can keep flowing, whether the pressurized medium is liquid or gas. Centrifugal pumps may be used, though they generally require a specific priming sequence, more power, and will stop running if gas is present in the line. Any pump that has the ability to self-prime, or has a mechanism in place to eliminate priming problems, may be preferable, although any pump could be used. Additionally, the pump should be able to maintain a certain pressure at a given flow rate. As flow rate is a function of an activation solvent coat thickness, label speed, and label width, different applications will have different requirements. Flow rate can be calculated using the equation:

$$\text{Flow Rate (mL/min)} = [\text{Thickness (mils)} * \text{Label Speed (in/sec)} * \text{Label Width (in)} * 60 \text{ sec/min}] / [0.06102 \text{ in}^3/\text{mL} * 1000 \text{ mils/in.}]$$

Flow rates between about 100 mL/min (0.75 mils, 15 in/sec, 9 in) and about 0.14 mL/min (0.15 mils, 2 in/sec, 0.5 in) are anticipated based on typical industry parameters, however a wider range of flow rates may be handled. Determining an appropriate pressure for different flow rates is difficult, though pressure requirements can be estimated with the following equation:

$$\text{Pressure (psi)} = 0.136 * \text{Flow Rate (mL/min)} + 1.93$$

Based on this equation, a pressure of around 15 psi would be required to support an anticipated high flow rate and a pressure of around 1.9 psi would be required to support an anticipated low flow rate.

The check valve 206 is fluidically coupled to the pump 204 via a pump outlet 252 and a check valve inlet 254. The check valve 206 can be one of many different types, such as the #301 check valve from Smart Products (Morgan Hill, Calif.), capable of allowing flow in only one direction, downstream from the reservoir and the pump 204. In another embodiment, the check valve 206 may be an insert within flexible tubing, such as a flow control from The Lee Company (Westbrook, Conn.), which may be smaller than the previously described check valves.

The pressurization chamber 208 is fluidically coupled to the check valve 206 via a check valve outlet 256 and a pressurization chamber inlet 258. The pressurization chamber 208 maintains pressure within the activator 200 for instantaneous activation, so that the pump 204 need not be operating at full pressure or full time, since the pump 204 must ramp up to and down from operating pressure as it is turned on and off. In contrast, pressurized fluid maintained in the pressurization chamber 208 may be used, as desired.

Figure 5:
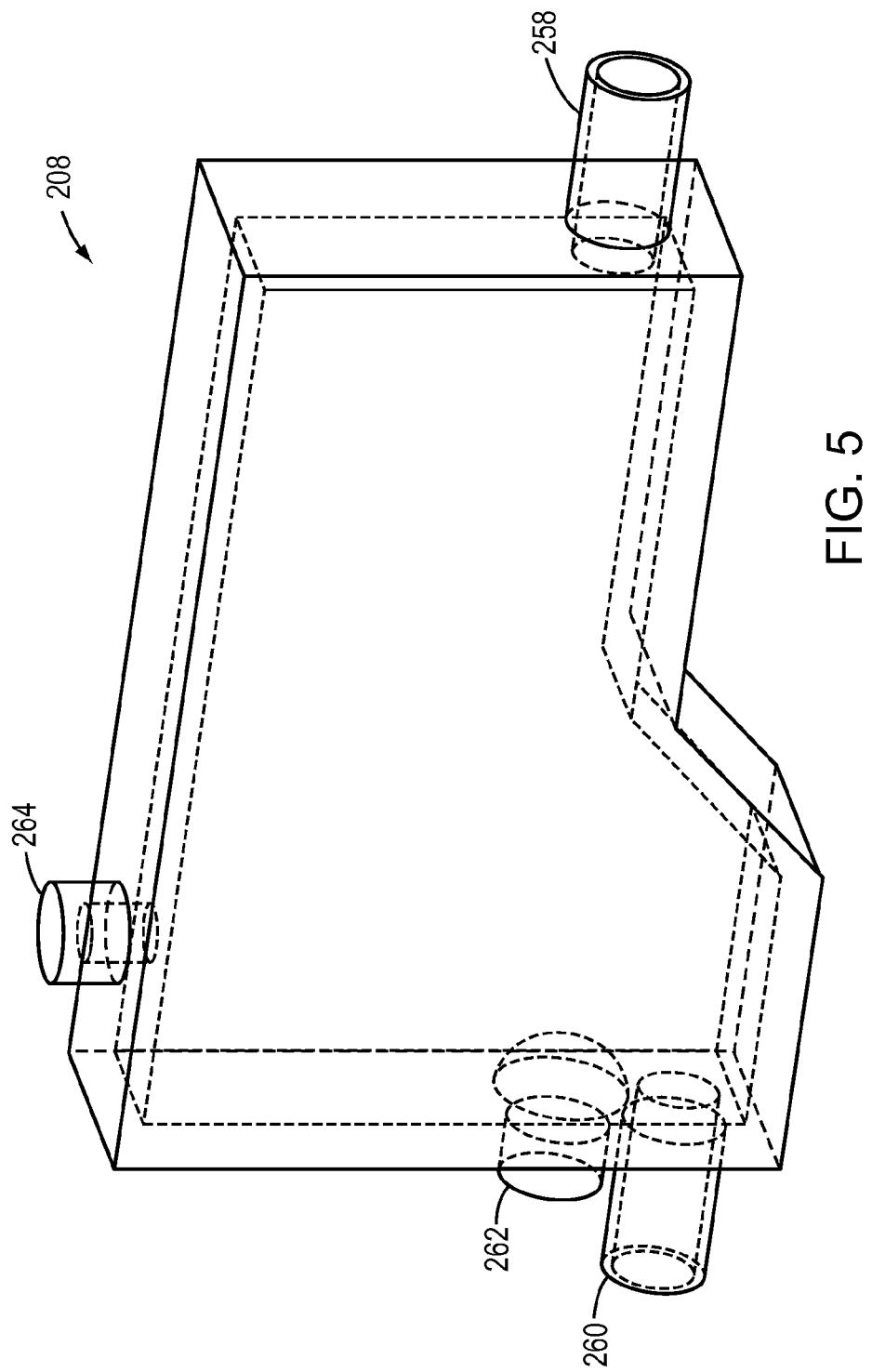
FIG. 5 is a schematic isometric transparent view of a pressurization chamber in accordance with one embodiment of the invention.

One embodiment of the pressurization chamber 208 is depicted in FIG. 5. The pressurization chamber 208 may be substantially rectangular and oriented in an upright position, for compactness. The pressurization chamber 208 in this embodiment may be configured to hold a fluid volume in a lower portion and a variable gaseous volume in an upper portion. The pressurization chamber inlet 258 is disposed on one side of the pressurization chamber 208. A pressurization chamber outlet 260 is disposed on an opposite side of the pressurization chamber 208 from the pressurization chamber inlet 258. The pressurization chamber outlet 260 is also disposed at a lower level than the pressurization chamber inlet 258 to promote fluid flow out of the pressurization chamber 208. A fluid sensor 262 may be disposed above the pressurization chamber outlet 260 to detect if the fluid volume falls below a certain level. An air valve 264 is disposed on a top side of the pressurization chamber 208 and can open automatically, to release excess air volume in the system.

When the liquid valve 210 upstream of the applicator 212 is closed, fluid that is pumped into the pressurization chamber 208 increases the fluid volume within the pressurization chamber 208, raising the pressure of air within the pressurization chamber 208 by compressing the gaseous volume. Once the liquid valve 210 is opened, the pressurized gaseous volume pushes against all surfaces in attempting to regain its equilibrium volume, forcing fluid out of the pressurization chamber outlet 260 to the applicator 212. If system pressure and/or fluid level in the chamber 208 falls below a predetermined value, the control system 214 turns on the pump 204 to refill the chamber 208.

An alternative embodiment of a pressurization chamber can include a length of tubing or other structure with an elastic wall. As pressure builds within the tubing, the elasticity of the wall allows it to stretch to a greater diameter. Once a valve is opened, fluid is driven by the contraction of the tubing to its equilibrium diameter. In another embodiment, a pressurization chamber includes a vertical column of fluid which is raised when fluid is added and a liquid valve is closed, increasing the stored potential energy in the column of fluid. When the liquid valve is opened, the increased potential energy provides sufficient flow to temporarily operate an applicator.

The liquid valve 210 in the depicted embodiment is fluidically coupled to the pressurization chamber 208 via a liquid valve inlet 266 and the pressurization chamber outlet 260. The liquid valve 210 regulates when fluid is sent to the applicator 212 from the pressurization chamber 208. In one embodiment, the liquid valve 210 is a normally-closed solenoid valve, though any valve that is capable of controlling a flow of fluid may be used (e.g., a pinch valve designed to selectively obstruct a length of flexible tubing). In embodiments of the activator 200 where the liquid valve 210 is used, the state of the liquid valve 210 (open or closed) dictates whether the activator 200 is operating (i.e., operating when open, not operating when closed).

The applicator 212 is fluidically coupled to the liquid valve 210 via a liquid valve outlet 268 and an applicator inlet 270. In one embodiment, the applicator 212 is substantially cylindrical with a series of small, uniformly spaced discharge apertures 272 (e.g., a spray bar). The applicator 212 may be basically any shape that allows for at least one discharge aperture 272 to be aimed at an activation site, though it may have a tapered cross-sectional area or varying aperture sizes to produce a uniform spray pattern on the adhesive layer of the label passing thereby. The applicator 212 is located near the activation site of a label path where a label will pass through and be sprayed with solvent. The discharge apertures 272 act as nozzles by taking a relatively large, slow volume of flowing liquid and transforming it into faster, more focused flows (i.e., liquid jets). The discharge apertures 272 are closely located to the activation site, close enough to produce a focused and accurate liquid jet but far enough away to avoid physical contact with a label and to allow a spray pattern to develop. Alternative embodiments use a single aperture nozzle to jet a pressurized activation solvent onto the activation site, typically in a flat fan pattern.

The discharge apertures 272 are the components that ultimately govern the flow rate, which in turn dictates a desired activation solvent coat thickness on a label. The application of this solvent coat thickness is an important step in activating a label adhesive layer. Solvent coat thickness can be determined using the following equation:

$$\text{Thickness (mils)} = [\text{Flow Rate (mL/min)} * 0.06102\ \text{in}^3/\text{mL} * 1000\ \text{mils/in}]/[\text{Label Speed (in/sec)} * \text{Label Width (in)} * 60\ \text{sec/min}]$$

As seen in the equation, the thickness is directly influenced by the flow rate, label speed, and label width. Both label speed and label width are determined by the label printer or other equipment upstream of the activator. Each of these variables may be fixed for each individual printer, label dispenser, etc., or they can vary. Assuming a fixed installation, this leaves the flow rate as the remaining variable in achieving the desired coat thickness. We can look further into the flow rate by relating the flow rate to the diameter of the nozzles and the number of nozzles in the manifold of the applicator 212, using the following equation:

$$\text{Flow}_{new} = \text{Flow}_{old} * (\#\text{Nozzles}_{new}/\#\text{Nozzles}_{old}) * (\text{Diam}_{new}^2/\text{Diam}_{old}^2)$$

This equation relates a known configuration (noted "old") to an idealized prediction (noted "new"). Experimental data collected using a nozzle manifold with 20 nozzles that are 42 microns in diameter revealed that the nozzle produced a flow rate of 9.733 mL/min. From this information, an equation for a new expected flow rate is:

$$\text{Flow}_{new}\ (\text{mL/min}) = 9.733\ (\text{mL/min})/[20*42^2(\mu)] * \#\text{Nozzles}_{new} * \text{Diam}_{new}^2(\mu)$$

This equation assumes that the pressure within the system is constant. However, the system pressure has a dynamic relationship with the nozzle area (i.e., if nozzle area increases, pressure drops since more is lost through larger nozzles, etc.). The equation still provides some useful approximations.

A series of nozzles were selected to conduct experimental tests on flow rate, pressure, jet quality, etc. based on the above equations. While solvent thicknesses between about 0.3 and 0.5 mils are typical, this range can be extended to between about 0.15 and 0.75 mils, or even further. The coat thickness influences the adhesive quality of the activated label, and can be varied to cater to different application requirements on corrugated cardboard or other substrates to which the labels are applied. This range can be further extended to meet the needs of labels in areas outside corrugated cardboard shipping labels, such as labels used on glass bottles.

Figure 6:
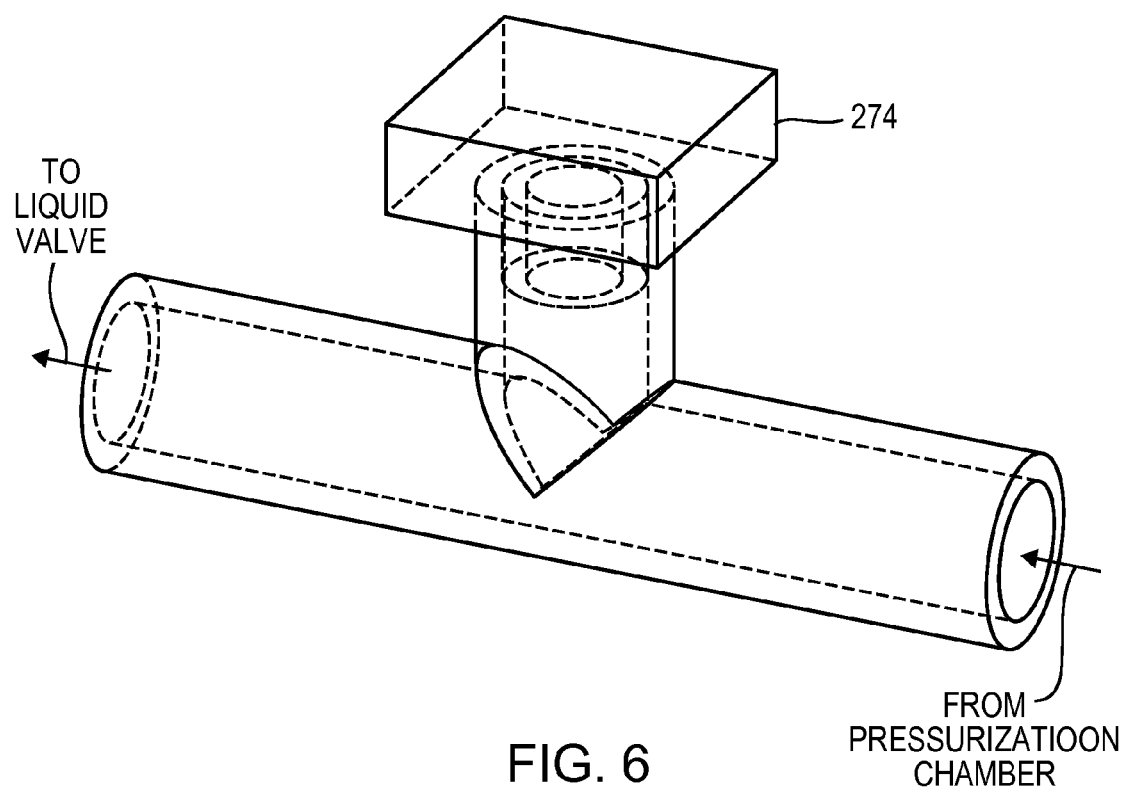
FIG. 6 is a schematic isometric transparent view of a pressure sensor in accordance with one embodiment of the invention.

A control system 214 is provided to control or to monitor some or all of: the pump 204, the air valve 264, the liquid valve 210, the reservoir 202, the applicator 212, and related system sensors. The control system 214 controls when the pump 204 is in operation based on a pressure in the pressurization chamber 208. A pressure sensor 274, as depicted in FIG. 6, may be utilized to determine the pressure within the pressurization chamber 208. In one embodiment, the pressure sensor 274 may be placed in a "T" in a connection between the pressurization chamber 208 and the liquid valve 210 to monitor the pressure at that point in the system. The control system 214 compares the actual pressure with a preset operational pressure range and initiates the pump 204 if the pressure is too low. It then deactivates the pump 204 when system pressure exceeds the upper end of the pressure range. In other embodiments, the fluid sensor 262 may be used to control pump 204 operation, alone or in conjunction with the pressure sensor 274. If the fluid sensor 262 detects the fluid volume is too low, the control system 214 can in turn activate the pump 204 to raise the fluid volume. In another embodiment, a sensor may be placed in the gaseous volume of the pressurization chamber 208. If the gaseous volume is too large or the gaseous pressure is too low, the control system 214 can again activate the pump 204 to operate until a desired pressure or volume is reached.

The air valve 264 can also be controlled, either manually, passively, or automatically by the control system 214, to adjust the gaseous volume in the pressurization chamber 208. Additional gas may be inadvertently introduced into the pressurization chamber 208 whenever a solvent cartridge is replaced. If the gaseous volume is too great, the pressurization chamber 208 may stop working properly (e.g., the pump 204 may cycle too frequently). In one embodiment, the fluid sensor 262 may be used to detect the level of the fluid volume in the pressurization chamber 208. If the fluid volume is too low, even when system pressure is within range, the fluid sensor 262 may send a signal to the control system 214 to open the air valve 264 until the fluid volume is restored to a desired level, at which time the air valve 264 would close. Alternatively, a user could be directed to manually open the valve and bleed air from the system, for example by illumination of an error light, display of an error code or message, etc.

The liquid valve 210 is controlled to permit and prevent flow to the applicator 212 and, accordingly, allow and disallow activation. The liquid valve 210 should be opened whenever a label to be made sticky is present in the activation zone and then closed once a label has been rendered tacky. In one embodiment, a signal to begin activation can be based on a signal from the upstream equipment. In the case of a printer, there is an electronic connection between the control system 214 and an electronic control system of the printer. The control system 214 can process a signal from the printer control system indicating that a label is at a specific location along the label path. The control system 214 may then signal the liquid valve 210 to open after a known delay for a label to move from its location in the printer label path to the activation zone, also compensating for a known delay between opening the liquid valve 210 and initiation of spraying at the activation site. The control system 214 may also signal the liquid valve 210 to close at some time increment after opening based on a length and speed of a label passing through the activation zone. In alternative embodiments, one or more sensors may be used at the activation site to determine the presence of a label (or the passing of the end of a variable length label), thereby decreasing or eliminating the need to calculate the delay that must be implemented by the control system 214. In other alternative embodiments, one or more sensors may be used to monitor a physical action upstream such as a rotation of the platen motor or a firing of the printer's cutter, amongst other components.

In embodiments of the activator 200 where the reservoir is a cartridge, the cartridge can be mechanically and/or electrically linked to the dock 120 and the control system 214 to monitor a level of fluid within the cartridge. In other embodiments, with or without a cartridge, a liquid level sensor within the reservoir may be used. Alternatively or additionally, a flow meter outside of the reservoir may be used to monitor the amount of fluid that has flowed from the reservoir. When the fluid level in the reservoir is determined to be low, the control system 214 may signal the user through some audio and/or visual interface, such as a siren buzzer or LED, that the reservoir is running low on fluid.

To ensure substantially instantaneous delivery of fluid at the activation site, the applicator 212 may include a sensor to detect if a sufficient level of fluid is present in the applicator 212 to spray the activation site. If there is not sufficient fluid, the control system 214 can open the liquid valve 210 for a short period of time to fill the applicator 212.

A cutting mechanism 240 may be included in embodiments of the invention for use with uncut label stock or other media. The cutting mechanism 240 is disposed along the label path, typically before the activation site in the applicator 212. Media passes through the cutting mechanism 240, is cut prior to entering the activation site, and then passes over the applicator 212 where it may be activated. The cutting mechanism 240 may be controlled by the control system 214 to sever the media at any desired size. By cutting the media prior to activation, the cutting mechanism 240 is at less risk of gumming or other adverse effects of unintended adhesive exposure. In one embodiment, the cutting mechanism is a four inch type "L" cutter from Hengstler (Aldinger, Germany).

Figure 7:
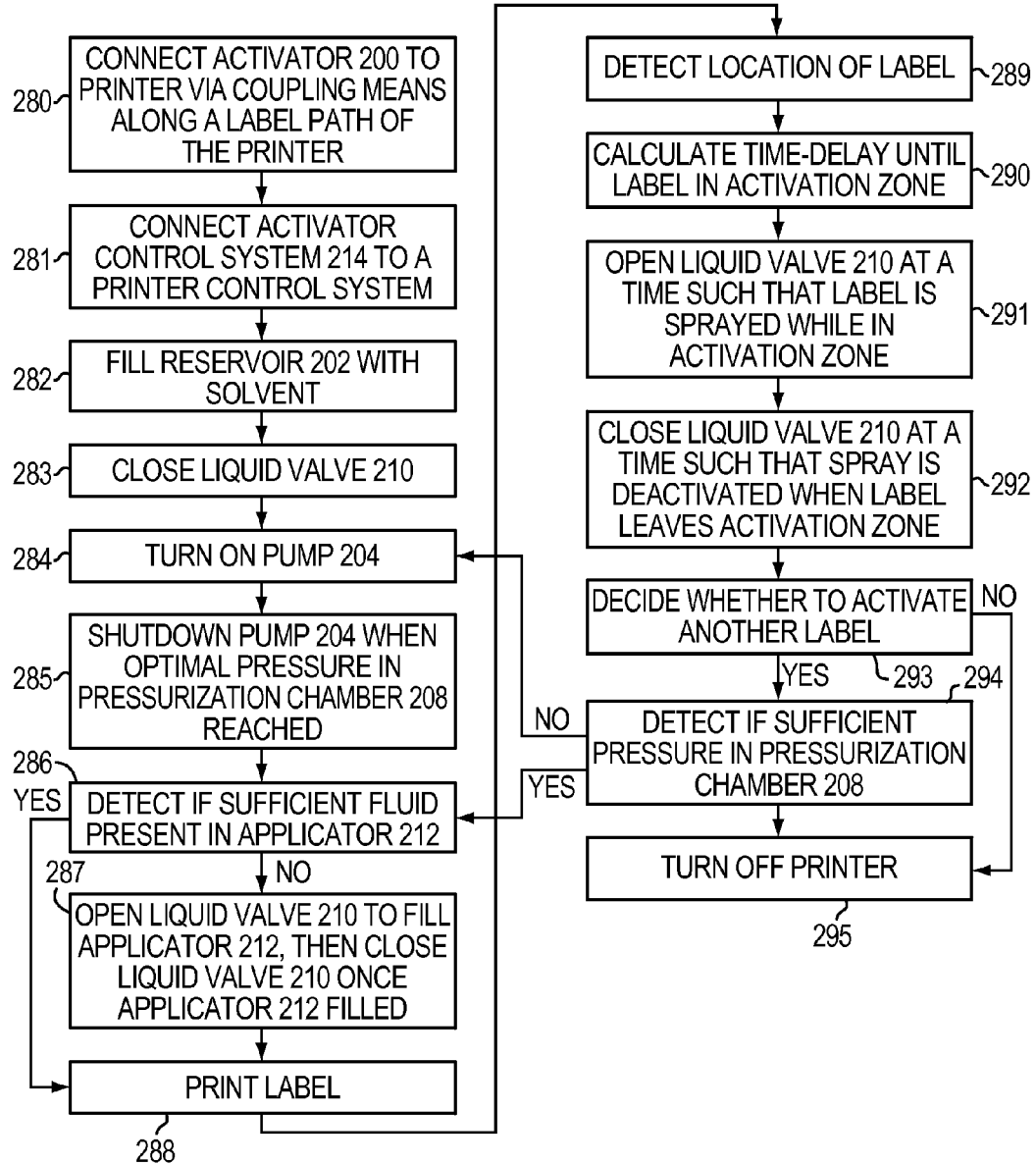
FIG. 7 is a flowchart of the operation of the liner-free label activator depicted in FIGS. 4A-4E, in accordance with one embodiment of the invention.

FIG. 7 depicts a flowchart detailing one method for operating the liner-free label activator 200. First, the activator 200 is connected physically to a printer or other equipment with any suitable coupling along a label path of the printer (step 280). Then, the activator control system 214 is connected to a printer control system (step 281). Naturally, the physical and electrical connection can occur simultaneously. The reservoir 202 may be pre-filled or filled with solvent (step 282) or the cartridge may be installed or previously installed. The liquid valve 210 is closed at this point (step 283). The pump 204 can be turned on (step 284) to initially pressurize the fluidic system and then shut down, once an optimal pressure in the pressurization chamber 208 is reached (step 285). Next, the control system 214 detects if a sufficient amount of fluid is present in the applicator 212 (step 286). If there is not a sufficient amount of fluid, the liquid valve 210 is opened to fill the applicator 212, then the liquid valve 210 is closed once the applicator 212 is filled (step 287). When a label is printed (step 288), a location of the label is detected (step 289) and a time-delay until a label is in the activation zone is calculated (step 290). The liquid valve 210 is opened at an appropriate time at the end of the delay, so that a leading edge of the label is sprayed as soon as it enters the activation zone (step 291). The liquid valve 210 is closed to discontinue the spray as soon as a trailing edge of the label leaves the activation zone (step 293). Then, the control system 214 decides whether to activate another label (step 293). If another label is being printed or arriving along the label path, the control system 214 detects if there is sufficient pressure (step 294) in the pressurization chamber 208. If there is not sufficient pressure, the pump is turned on (step 284) and the process is resumed from that point. If there is sufficient pressure, the control system 214 detects if there is sufficient fluid in the applicator 212 (step 286) and the process resumes from there. If another label is not being printed or arriving along the label path, the printer may be turned off (step 295), as well as the activator.

Figure 8A:
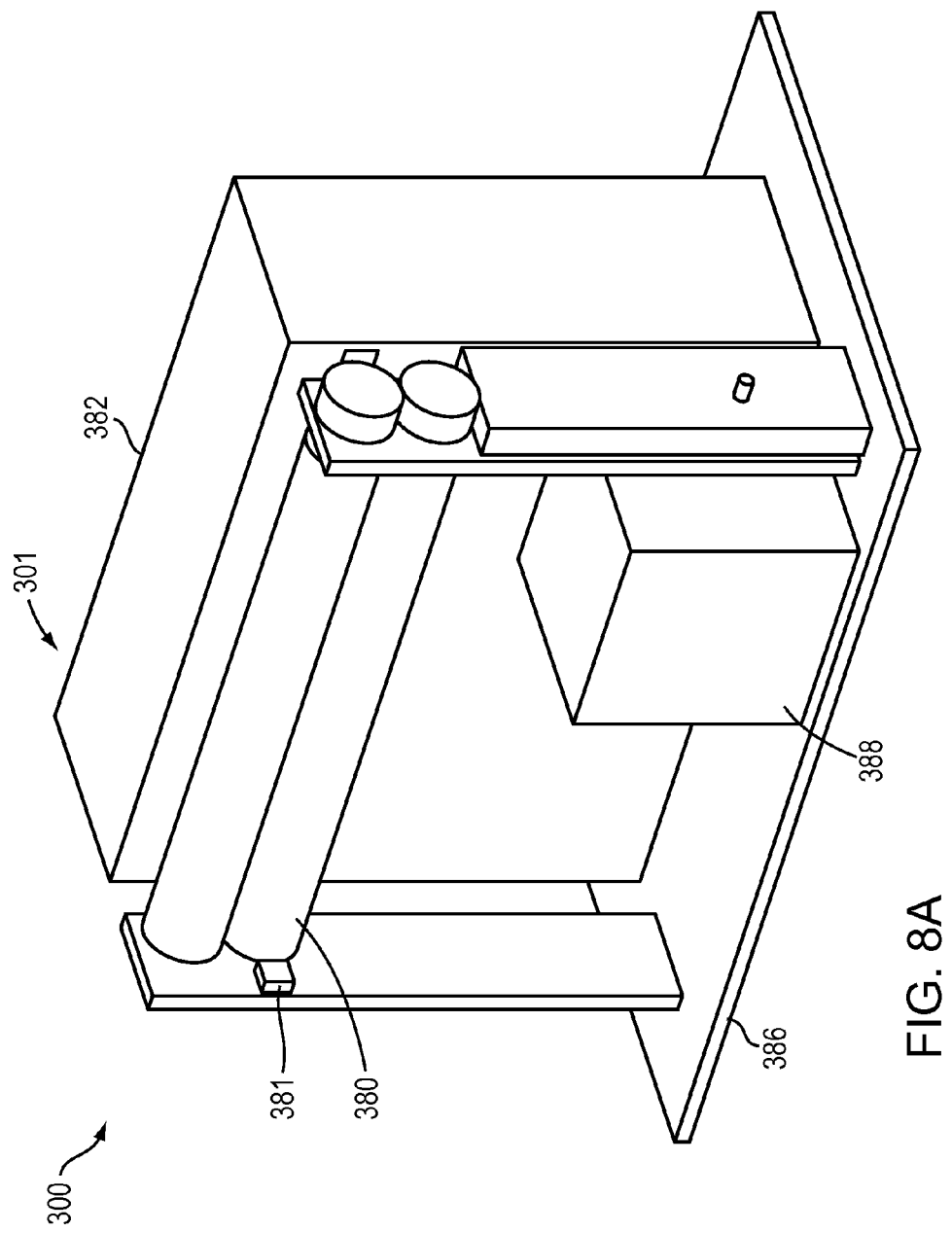
FIGS. 8A and 8B are schematic isometric views of a standalone liner-free label activator in accordance with one embodiment of another aspect of the invention.
Figure 8B:
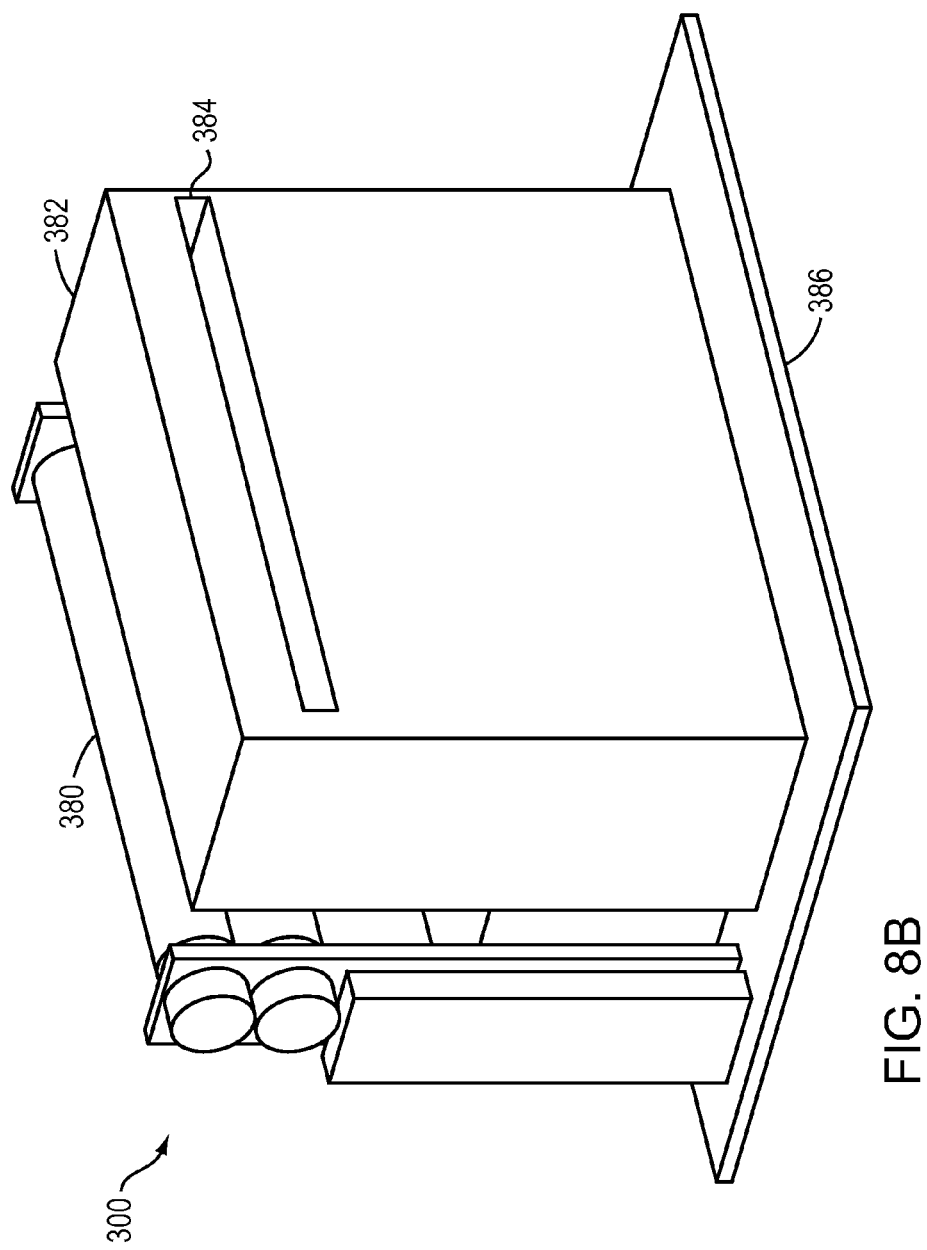

FIGS. 8A and 8B depict a standalone liner-free label activator 300. The standalone liner-free label activator 300 includes an activator subassembly 301 and a mechanical or other system 380 for moving a label.

The activator subassembly 301 typically includes many of the components previously described, including a housing, a reservoir, a pump, an applicator, and an activator control system. Other previously described components, such as a check valve, a pressurization chamber, a liquid valve, and a cutting mechanism, may also be included in the activator subassembly 301. In one embodiment, the activator subassembly 301 may be encased in a cover 382. In one embodiment, the cover 382 may be substantially rectangular, though any shape suitable to cover the components may be used. The cover 382 forms a label slot 384. The label slot 384 is configured to accept a label moving therethrough, and also defines an activation site where a label is activated. In one embodiment, the activator subassembly 301 is mounted to a weighted baseplate 386 for stability.

Components of the activator subassembly 301 such as the activator control system that rely upon a printer or other upstream equipment for control signals or other information, must instead obtain relevant information from within the activator 300. In one embodiment, an optical sensor 381 is used to determine when a label is in the activation site. The optical sensor 381 can be placed immediately before or after the system 380. Alternatively, a more complex system mapping the size and location of a label within the system may be used to determine when the applicator should be operating.

The system 380 for moving the label may also be mounted to the baseplate 386 or can be attached to or integrated within the cover 382. The label moving system 380 is configured to accept a label and move it through the activator subassembly 301 and dispense the activated label out the slot 384. By placing the system 380 upstream of the activator subassembly 301, the system 380 is not exposed to activated adhesive. A prime mover of the system 380 can be a motor 388. A power connection may also be provided to connect to a power source to power the motor 388 and the activator subsystem 301. The power connection may be any of a variety of forms, though a typical power connection in the US could include a 12V DC adapter that converts the 120V AC current from a standard wall outlet. In one embodiment, the label moving system 380 is a pair of gear or friction drive pinch rollers. The pinch rollers are aligned with the label slot 384 to move a label through the label slot 384 without the label contacting any of the edges of the cover 382. In another embodiment, structure similar to a platen roller and a stationary print head in a printer may be used to feed a label forward and backward through the system. The system 380 may operate at any speed that allows for consistent and sufficient activation of a label.

Figure 9:
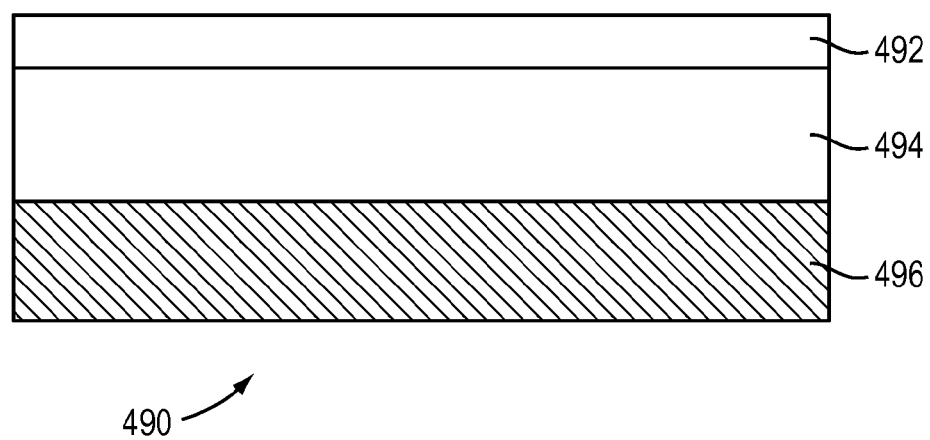
FIG. 9 is a schematic sectional view of a liner-free label in accordance with one embodiment of the invention.

Another aspect of the invention relates to methods of manufacturing a liner-free label. FIG. 9 depicts a cross-section of one embodiment of a solvent-sensitive three layer liner-free label (or solvent-sensitive adhesive sheet) 490. Other layers can be applied, as will be apparent to those skilled in the art. The liner-free label 490 includes a heat-sensitive color forming layer (i.e., thermal printable layer) 492 which is formed on a front side of a face stock (label web) 494, while a solvent sensitive adhesive agent layer 496 is formed on a back side of the face stock 494. The layers may be made of different materials. The printable layer 492 may be preprinted, variable image, or blank.

The solvent-sensitive adhesive agent layer 496 should contain an amount of solvent-sensitive adhesive agent sufficient for the solvent-sensitive adhesive agent layer 496 to form a pressure sensitive adhesive-like bond once the solvent-sensitive adhesive agent layer 496 is activated. The solvent-sensitive adhesive sheet 490 may be of any width, length, and thickness that is appropriate for passing through a label printer and a solvent activation apparatus, such as about 0.25 inches to about six inches in width or greater, about 0.5 inches to eight inches in length or greater, and about 0.0015 inches to 0.015 inches thick. The solvent-sensitive adhesive agent layer 496 may be about 0.0005 inches to 0.005 inches thick. The face stock 494 may be about 0.0005 inches to 0.005 inches thick. The printable layer 492 may be about 0.0005 inches to 0.005 inches thick.

The face stock 494 may be commercially available, such as thermal paper having a weight of about 77 to 82 grams per square meter; however, numerous other face stocks, including, but not limited to, natural and synthetic fabrics, thermal transfer paper, plastic face stock, steel, plastic, recycled paper, Tyvek®, cardboard, and paperboard can also be coated. The face stock 494 may have a weight of at least about 30 grams per square meter and not more than about 300 grams per square meter. The face stock 494 may also have a radio-frequency identification (RFID) device or other electronic chip embedded within the face stock 494 or between the face stock 494 and the printable layer 492 or between the face stock 494 and the adhesive agent layer 496. In direct thermal applications, a thermally activated paper weighing about 82 grams per square meter with a caliper of about 3.3 mils per micrometer may be used. Paper of this quality is available commercially from Appleton (Appleton, Wis., USA) under the trade name 675-Wavex® 400-3.3, a topcoated black image product.

One method of preparation of the solvent-sensitive adhesive agent layer 496 is to make a solvent-sensitive adhesive liquid solution, having a solvent-sensitive selectively adhesive polymer or other additives, to be applied and dried to the face stock 494. The solution is a combination of dry solids and a solvent system, which can contain, without limitation, different proportions of polymers, natural adhesive agents, synthetic adhesive agents, and tackifiers, or the like, and combinations thereof.

In one embodiment, the dry solids contain greater than about 50% (by weight) poly(vinyl alcohol) (PVOH), optionally with other water soluble thermoplastic polymer adhesives, such as, but not limited to: poly(vinyl acetate) (PVA), polychloroprene, polyurethane, and combinations thereof. Another embodiment of the liquid phase solvent system contains greater than about 90% (by volume) water, with any remaining liquid optionally being a solvent, such as, but not limited to, isopropyl alcohol, ethanol, dimethyl sulfoxide, dimethylformamide, and combinations thereof. The solution is created by mixing the dry solids with the solvent system. Various solutions contain between about 10% and about 60% solids (by weight) dissolved in the described solvent system, but may extend beyond this range.

One embodiment of the adhesive label is composed of a dehydrated layer of poly(vinyl alcohol) (PVOH). The preferred average molecular weight (MW) of the PVOH is not less than about 30,000 and not greater than about 50,000 and the PVOH is not less than about 87% and not greater than about 90% hydrolyzed. This composition is commercially available through a number of suppliers, including Sigma Aldrich (St. Louis, Mo.). The PVOH is applied to the substrate in a solution containing about 50% water by weight, with the remaining about 50% being PVOH or other solvents to speed the drying process, including but not limited to isopropyl alcohol, ethanol, dimethyl sulfoxide (DMSO), and/or dimethylformamide (DMF). Organic solvents are particularly useful in this capacity due to their high volatility.

In alternative embodiments, the adhesive may be composed of co-polymer blends of PVOH with other water soluble thermoplastic polymer adhesives, including but not limited to: poly(vinyl acetate) (PVA), polychloroprene, polyurethane, and combinations thereof. The blends may include no less than about 50% PVOH and no greater than about 98% PVOH by dry weight. A remaining about 2% to about 50% of the chemical composition can be composed of one of the above referenced thermoplastic adhesive polymers. No less than about 0.1% and no more than about 12% of the adhesive blend may contain elastomers (typically, but not necessarily thermosets) and tackifying agents. Possible elastomers include, but are not limited to: polyacrylic rubber, fluoroelastomers, perfluoroelastomers, and combinations thereof.

A variety of methods may be used to coat a viscous liquid onto paper or other face stocks used as the label web 494. One method of applying a coating of the aforementioned solvent-sensitive adhesive agent layer 496 is a reverse gravure coating method. Knife over roll, air knife, direct gravure, differential offset gravure, and other coating methods may alternatively be used to apply the solvent-sensitive adhesive agent layer 496 to the desired face stock 494. One coating weight is about 13 grams per square meter, but this coating weight may vary in a range to as much as about 40 grams per square meter or greater to as few as about 5 grams per square meter or less. This coating weight measurement is taken after the solvent-sensitive adhesive agent layer 496 has been dried and is in a non-adhesive state.

The solvent-sensitive adhesive agent layer 496 is designed to mimic, in certain aspects, the adhesion properties of a pressure sensitive adhesive (PSA), but only after the solvent-sensitive adhesive agent layer 496 has been activated by a solvent applied to the solvent-sensitive adhesive agent layer 496, thereby tackifying the solvent-sensitive adhesive liner-free label 490.

Coating weights can be varied as to mimic other adhesion properties. Alternatively or additionally, the ratio of solids to liquid can also be varied to affect the adhesive properties. The contents of the dry solid mix can also be varied to have a similar impact.

EXAMPLE

A series of solvent-sensitive adhesive liner-free labels 490 were prepared in accordance with the teachings above and the following detailed description to test adhesion properties. All test samples were conditioned at 73±3° F. and 50±5% relative humidity for at least 24 hours prior to testing. In accordance with the embodiment(s) described above, the solvent-sensitive adhesive agent layer 496 was coated on 77 gram per square meter thermal paper. Each sample's solvent-sensitive adhesive agent layer 496 was both (1) prepared with a unique dry solids percentage but within the preferred dry solids percentage range described above, and (2) coated using a different coating method from the list of preferred coating methods described above.

A first sample (Sample 1) was coated with a liquid solution containing 18% solids using a gravure method with a 24TH Gravure Cylinder as the coating instrument. A second sample (Sample 2) was coated with a liquid solution containing 22% solids using a knife over roll method. A third sample (Sample 3) was coated with a liquid solution containing 20% solids using a modified knife over roll method.

The samples were cut to one inch wide strips as required by the test methods. These results are summarized in Tables 1, 2, and 3. Tables 1 and 2 represent the results of peel adhesion tests. Peel adhesion was tested according to a modified ASTM D 3330 method F. The modification included testing at a dwell time of sixty seconds and a dwell time of sixty minutes. Dwell time is the amount of time the activated label is in contact with a substrate. Dwell time does not incorporate the elapsed time between activation and application to a substrate.

Samples of the solvent-sensitive adhesive agent layer 496 of the solvent-sensitive adhesive liner-free labels 490 were activated by de-ionized water sprayed from a hand controlled spray nozzle just prior to application. Per the testing protocol, samples were applied to a standard stainless steel or corrugated substrate at a rate of 24 in./min. with a 4½ pound rubber covered roller according to the method. The sample was then peeled from the substrate at a 90° angle with a dwell time of sixty seconds or sixty minutes. The force required for removal was measured, averaged, and the mode of failure noted. Three replicates of each sample were tested. Table 1 displays results from tests carried out on stainless steel while Table 2 displays results from tests carried out on corrugated cardboard.

TABLE 1

Results of 90° Peel Adhesion to Stainless Steel.
TABLE 1: 90° Peel Adhesion to Stainless Steel

| Sample I.D. | Coat Weight grams/m$^2$ | 60 Second Dwell | | | | 60 Minute Dwell | | | |
| --- | --- | --- | --- | --- | --- | --- | --- | --- | --- |
| | | Avg. (grams/ 25 mm$^2$) | σ | n | MOF | Avg. (grams/ 25 mm$^2$) | σ | n | MOF |
| 1 | 12.5 | 158.4 | 26.3 | 3 | A | 286.5 | 38.2 | 3 | A |
| 2 | 20.0 | 118.0 | 6.7 | 3 | A | 386.4 | 12.1 | 3 | A |
| 3 | 13.5 | 137.8 | 12.2 | 3 | A | 223.1 | 30.4 | 3 | A |

AVG. - the average value of the replicates
σ - standard deviation
n - number of replicates
MOF - mode of failure
Numbers 1 to 9 = %, as A8T2 is a 80% clean peel with 20% transfer of the adhesive to the substrate.
A - adhesive failure - the adhesive was removed from the substrate cleanly.
T - adhesive transfer - the adhesive transferred from the face stock to the substrate. Usually attributed to poor anchorage.
Numbers 1 to 3
1 = slight
2 = moderate
3 = severe
L - legging - the condition of a soft adhesive when strings or legs are formed when it is pulled.

TABLE 2

Results of 90° Peel Adhesion to Corrugated.
TABLE 2: 90° Peel Adhesion to Corrugated

| | Coat Weight | 60 Second Dwell | | | | 60 Minute Dwell | | | |
|---|---|---|---|---|---|---|---|---|---|
| Sample I.D. | grams/m$^2$ | Avg. (grams/25 mm$^2$) | σ | n | MOF | Avg. (grams/25 mm$^2$) | σ | n | MOF |
| 1 | 12.5 | 474.7 | 69.7 | 3 | A | 643.3 | 11.4 | 3 | SD |
| 2 | 20.0 | 524.9 | 24.9 | 3 | A1SD7FT5 | 520.6 | 78.2 | 3 | A4SD6 |
| 3 | 13.5 | 428.1 | 15.5 | 3 | A | 610.7 | 28.6 | 3 | SD9FT1 |

AVG. - the average value of the replicates
σ - standard deviation
n - number of replicates
MOF - mode of failure
Numbers 1 to 9 = %, as A2 SD8 is a 20% clean peel with 80% substrate delamination.
A - adhesive failure - the adhesive was removed from the substrate cleanly.
FD - face delamination - the face stock delaminated or separated during testing. The adhesive bond strength exceeded the internal strength of the face material.
SD - substrate delamination - the substrate delaminated or tore during testing. The adhesive bond strength exceeded the internal strength of the substrate.
Numbers 1 to 3
1 = slight
2 = moderate
3 = severe
L - legging - the condition of a soft adhesive when strings or legs are formed when it is pulled.

In addition to peel adhesion tests, dynamic shear tests were conducted. Dynamic shear was measured by a modified ASTM D 1002 method on a ChemInstruments DS-1000 Dynamic Shear Tester (Mentor, Ohio). The modification of the method related directly to activating the adhesive agent layer prior to the application of the liner-free solvent sensitive adhesive label to the substrate. The liner-free solvent sensitive adhesive labels were prepared in a manner so that a 1 inch by 1 inch surface of the label made contact with the substrate. These samples were prepared as required by ASTM D3654 to perform a static shear test.

A 1 inch by 1 inch surface contact area of the adhesive sample was applied to the stainless steel substrate and allowed to dwell for 5 minutes. The test sample was then pulled apart in the plane of the substrate at a rate of about 0.05 inch per minute. The peak force required to separate or break the sample was recorded and the mode of failure noted. Three replicates of each sample were tested. Table 3 summarizes the results of the dynamic shear tests.

TABLE 3

Summary of results of dynamic shear of various samples.
TABLE 3: Dynamic Shear

| | Coat Weight | 5 Minute Dwell | | | |
|---|---|---|---|---|---|
| Sample I.D. | grams/m$^2$ | Max (grams/25 mm$^2$) | σ | n | MOF |
| 1 | 12.5 | 13427.1 | 901.7 | 3 | FT |
| 2 | 20.0 | 13083.9 | 51.5 | 3 | FT |
| 3 | 13.5 | 14142.8 | 489.3 | 3 | FT |

MAX. - the maximum value of each replicate test
σ - standard deviation
MOF - mode of failure
Numbers 1 to 9 = %, as A9T1 is a 90% clean peel with 10% transfer of the adhesive to the substrate.
C - cohesive failure - the adhesive split, leaving residue on both the face stock and substrate.
FT - face tear - the face stock broke or tore during testing. The adhesive bond strength exceeded the internal strength of the face material.

In addition to the peel adhesion and dynamic shear tests performed on samples of solvent-sensitive adhesive liner-free labels 490 prepared in accordance to the teachings and methods described above, the same peel adhesion and dynamic shear tests performed on the solvent-sensitive adhesive liner-free label samples were performed using samples of pressure-sensitive adhesive label samples, such as the Z-Perform 2000D Thermal Shipping Label from Zebra Technologies (Lincolnshire, Ill.). The pressure-sensitive adhesive label sample contained a face stock, a pressure-sensitive adhesive layer, and a release liner. The release liner was manually removed from the pressure-sensitive adhesive layer immediately prior to application to the test substrates. The samples were applied and removed from the test substrates in the same manner as described above for the solvent-sensitive adhesive liner-free label samples, and in accordance with the test protocols. The pressure sensitive-adhesive label samples were tested as a means of comparison between the present invention and existing embodiments of pressure-sensitive adhesive labels.

Table 4 summarizes the results of the 90° Peel Adhesion to Stainless Steel Test for the pressure-sensitive adhesive label sample (sample I.D. "Control").

TABLE 4

Results of 90° Peel Adhesion to Stainless Steel.
TABLE 4: 90° Peel Adhesion to Stainless Steel

| | 60 Second Dwell | | | | 60 Minute Dwell | | | |
|---|---|---|---|---|---|---|---|---|
| Sample I.D. | Avg. (grams/25 mm$^2$) | σ | n | MOF | Avg. (grams/25 mm$^2$) | σ | n | MOF |
| Control | 986.1 | 118 | 3 | A, L2 | 1143.5 | 20.4 | 3 | A |

AVG. - the average value of the replicates
σ - standard deviation
n - number of replicates
MOF - mode of failure
Numbers 1 to 9 = %, as A8T2 is a 80% clean peel with 20% transfer of the adhesive to the substrate.
A - adhesive failure - the adhesive was removed from the substrate cleanly.
T - adhesive transfer - the adhesive transferred from the face stock to the substrate. Usually attributed to poor anchorage.
Numbers 1 to 3
1 = slight
2 = moderate
3 = severe
L - legging - the condition of a soft adhesive when strings or legs are formed when it is pulled.

Table 5 summarizes the results of the 90° Peel Adhesion to Corrugated Test for the pressure-sensitive adhesive label sample (sample I.D. "Control").

TABLE 5

Results of 90° Peel Adhesion to Corrugated.
TABLE 5: 90° Peel Adhesion to Corrugated

| | 60 Second Dwell | | | | 60 Minute Dwell | | | |
| --- | --- | --- | --- | --- | --- | --- | --- | --- |
| Sample I.D. | Avg. (grams/ 25 mm$^2$) | σ | n | MOF | Avg. (grams/ 25 mm$^2$) | σ | n | MOF |
| Control | 205.2 | 69.7 | 3 | A | 212.6 | 11.4 | 3 | SD |

AVG. - the average value of the replicates
σ - standard deviation
n - number of replicates
MOF - mode of failure
Numbers 1 to 9 = %, as A2 SD8 is a 20% clean peel with 80% substrate delamination.
A - adhesive failure - the adhesive was removed from the substrate cleanly.
FD - face delamination - the face stock delaminated or separated during testing. The adhesive bond strength exceeded the internal strength of the face material.
SD - substrate delamination - the substrate delaminated or tore during testing. The adhesive bond strength exceeded the internal strength of the substrate.
Numbers 1 to 3
1 = slight
2 = moderate
3 = severe
L - legging - the condition of a soft adhesive when strings or legs are formed when it is pulled.

Table 6 summarizes the results of the dynamic shear tests for the pressure-sensitive adhesive label sample (sample I.D. "Control").

TABLE 6

Summary of results of dynamic shear of various samples.
TABLE 6: Dynamic Shear

| | 5 Minute Dwell | | | |
| --- | --- | --- | --- | --- |
| Sample I.D. | Max (grams/ 25 mm$^2$) | σ | n | MOF |
| Control | 9074.0 | 245.2 | 3 | C |

MAX. - the maximum value of each replicate test
σ - standard deviation
MOF - mode of failure
Numbers 1 to 9 = %, as A9T1 is a 90% clean peel with 10% transfer of the adhesive to the substrate.
C - cohesive failure - the adhesive split, leaving residue on both the face stock and substrate.

The peel adhesion to corrugated substrate results showed that the solvent-sensitive adhesive liner-free labels 490 (Sample 1, Sample 2, Sample 3) have peel adhesion strength to corrugated of at least twice as great as the peel adhesion strength to corrugated of a commercially available pressure sensitive adhesive label (Control). The implications of these results are significant commercially, as different applications require different peel adhesion strengths. For example, a variable information or barcode label applied to a corrugated substrate—as found in such commercial applications as the parcel industry and logistics and distribution operations of wholesalers, retailers, manufacturers, and the like—may require high peel adhesion strength, to guarantee the label adhesion to the substrate throughout the shipping process. In other commercial applications, for example price marking labels used by retailers and wholesalers, a price marking label may be desired to possess low peel adhesion strength, so that the label may be removed and replaced relatively easily.

Further testing was focused on reducing the time taken for the solvent-sensitive adhesive agent layer 496 to form a bond with a substrate. Additional formulations of the solvent-sensitive adhesive agent layer 496 were tested using a modified peel adhesion test according to a modified ASTM D 3330 method F. The modifications included testing at a variable dwell time. Sequential tests starting at a 60 second dwell time were performed, with each subsequent test being performed at a shorter dwell time. The test concluded when peeling no longer caused fiber tearing as the mode of failure. The purpose of this test was to gauge the minimum time needed to form a bond strong enough to cause fiber tear as the mode of failure. Another modification included testing on a corrugated cardboard substrate. All samples of the solvent-sensitive adhesive agent layer of the solvent-sensitive liner-free adhesive labels were activated by de-ionized water sprayed from a hand controlled spray nozzle just prior to application. Results are reported in Table 7 as average minimum time needed before fiber tear occurs as the mode of failure.

TABLE 7

Dwell time required to cause fiber tear as mode of failure for various adhesive formulations.
The same activation solvent (Solvent Formulation A) was used for all tests.

| | Adhesive Formulation | | | | | | |
| --- | --- | --- | --- | --- | --- | --- | --- |
| | A | B | C | D | E | F | G |
| | Percentage of Ingredient/Additive | | | | | | |
| Poly(vinyl alcohol) (PVOH) (25% w-v in water) (Celvol ® 205) | 100.0% | 95.2% | 94.3% | 89.3% | 94.3% | 97.6% | 97.1% |
| Ethylene vinyl acetate (EVA) (55% w-v in water) (Vinnapas ® EP 400) | — | 4.8% | — | — | — | — | — |
| Methyl Cellulose (100% w-v in water) | — | — | 1.9% | — | — | — | — |
| Water | — | — | 5.7% | 8.0% | — | — | — |
| 2-Pyrrolidinone, 1-ethenyl homopolymer (100% w-v in water) (also called polyvinylpyrrolidone (PVP)) | — | — | — | 2.7% | — | — | — |
| Poly(acrylic acid) (25% w-v in water) (Carbosperse ™ K-702 Polyacrylate) | — | — | — | — | 5.7% | — | — |
| Polyethylenglycol (PEG) (100% w-v in water) | — | — | — | — | — | 2.4% | — |

TABLE 7-continued

Dwell time required to cause fiber tear as mode of failure for various adhesive formulations.
The same activation solvent (Solvent Formulation A) was used for all tests.

| | Adhesive Formulation | | | | | | |
|---|---|---|---|---|---|---|---|
| | A | B | C | D | E | F | G |
| | Percentage of Ingredient/Additive | | | | | | |
| Glycerin (100% w-v in water) | — | — | — | — | — | — | 3.0% |
| Dwell Time to Fiber Tear (seconds) | 21.0 | 17.3 | 90.0 | 35.5 | 18.5 | 25.8 | 34.0 |

Note:
w-v indicates a weight to volume percentage.

Formulations B and E were further investigated and evaluated because they exhibited a lesser dwell time to fiber tear than the additive free Formulation A. Formulations A, B, and E were made and tested using a modified peel adhesion test according to a modified ASTM D 3330 method F. The modification included testing the peel strength after a 20 second dwell time, and also testing the peel strength after a 40 second dwell time. Results are reported as the average force required to peel the label from the cardboard substrate in Table 8.

TABLE 8

Peel strength tests with dwell times of 20 and 40 seconds.

| | 20 Second Dwell | | | 40 Second Dwell | | |
|---|---|---|---|---|---|---|
| Formulation | Ave. (grams/25 mm$^2$) | σ | n | Ave. (grams/25 mm$^2$) | σ | n |
| A | 9.55 | 4.94 | 2 | 10.19 | 2.65 | 6 |
| B | 9.99 | 2.68 | 6 | 14.52 | 3.62 | 6 |
| E | 12.74 | 2.18 | 5 | 13.92 | 4.51 | 6 |

The above tests evaluated a variety of possible adhesive formulations using eight different possible additives. Similar additives, ingredients, or excipients that may be used as replacements or in addition to those listed include, but are not limited to, remoistenable adhesives such as Craigbond 3425BT, 3425QT, and 3195W from Craig Adhesives and Coatings (Newark, N.J.), Reynco 123-75 from the Reynolds Company (Greenville, S.C.), Duracet RM (Franklin Adhesives and Polymers, Ohio), Royal Products BR-5177 and BR-4227 from Royal Adhesives and Sealants (South Bend, Ind.), BondPlus 347M from Industrial Adhesives (Chicago, Ill.), and other Cabrosperse K-700 series polymer systems from The Lubrizol Corporation (Wickliffe, Ohio). Also, other water soluble materials besides glycerin such as glycols, urea, citrates, sugars, sorbitol, polyethylene oxide, other grades of PEG and PVP, polyethyloxazoline, gelatin, polyacylamide copolymers, cellulose types such as CMC or EHEC, pectin, casein, polyacrylic acid as well as gums such as alginates, agar, arabic, carrageen, ghatti, guar, karaya, locust bean, tragacanth, and xanthenes may also be used or substituted in a similar manner.

As the test results indicate, the peel adhesion strength is easily manipulated for the solvent-sensitive adhesive agent layer 496 and as such, the solvent-sensitive adhesive liner-free label 490 and the solvent-sensitive adhesive agent layer 496 has applications in a variety of commercial fields including, without limitation: paper labels, thermally activated paper labels, labels used in the parcel industry, labels used in logistics and distribution operations of wholesalers, retailers, manufacturers, and the like; bar code labels; variable information labels; merchandise labels used in the operations of wholesalers and retailers; commercially printed product (or primary) labels; construction adhesives; and labels applied to plastic or glass substrates such as, without limitation, wine labels and beverage labels.

The dynamic shear results suggest the solvent-sensitive adhesive agent layer 496 of the solvent-sensitive adhesive liner-free label (Sample 1, Sample 2, Sample 3) has a shear value at least 4000 grams/25mm$^2$ higher than that of a commercially available pressure-sensitive adhesive label (Control). A high shear strength, with a moderate peel adhesive strength, is a desirable quality for an adhesive label, as it allows misplaced labels to be deliberately removed by peeling the label from the substrate; however, the label will not slide or unintentionally fall off of the substrate.

Another aspect of the invention relates to a solvent used to activate an adhesive agent layer. One embodiment of a solvent used to activate the adhesive contains at least about 95% water by weight, with a remaining about 5% being composed of one or more biocides to prevent biological activity within the product. Biocides may include, but are not limited to, chlorine, 2-bromo-2-nitropropane-1,3-diol (bronopol), odium o-phenylphenate, Diiodomethyl-p-tolylsulfone, and combinations thereof. In alternative embodiments, the solvent may include any mix of solvents that dissolve the corresponding adhesive composition including, but not limited to water, isopropyl alcohol, ethanol, and combinations thereof.

Some testing focused heavily on reducing the time taken for the adhesive to form a bond with the substrate. In order to accomplish this, a variety of non-toxic solvents were tested as the application solvent for the solvent sensitive adhesive liner-free label 490. The majority of these solutions primarily contained water with a dilute mix or blend of other solvent(s). A modified ASTM D 3330 method F test was conducted. The modification involves performing sequential testing, starting with a 60 second dwell time, and shortening the dwell time on each subsequent test. The test concluded when peeling no longer caused fiber tearing as the mode of failure. The purpose of this was to gauge the minimum time needed to form a bond strong enough to cause fiber tear as the mode of failure. One formulation of the solvent-sensitive adhesive agent layer 496 was used for all tests. The solvent blend was the variable being tested. All samples of the solvent-sensitive adhesive agent layer 496 of the solvent-sensitive liner-free adhesive labels 490 were activated by an equal volume of solvent sprayed from a hand controlled spray nozzle just prior to application. Results in Table 9 are an average minimum time needed before fiber tear occurs as the mode of failure.

TABLE 9

Dwell time required to cause fiber tear as mode of failure for various solvent formulations.
The same adhesive formulation (Adhesive Formulation A) was used for all tests.

| | Activation Solvent | | | | | | | | |
|---|---|---|---|---|---|---|---|---|---|
| | A | B | C | D | E | F | G | H | I |
| | Percent Content of Ingredient | | | | | | | | |
| DI Water | 100.0% | 93.0% | 93.0% | 93.0% | 93.0% | 97.0% | 98.5% | 95.0% | 97.5% |
| Methanol | — | 7.0% | — | — | — | — | — | — | — |
| Ethanol | — | — | 7.0% | — | — | — | — | — | — |
| Isopropanol | — | — | — | 7.0% | — | — | — | 2.0% | 1.0% |
| N-propanol | — | — | — | — | 7.0% | 3.0% | 1.5% | 3.0% | 1.5% |
| Dwell Time to Fiber Tear (seconds) | 28 | 38.3 | 35.7 | 31.7 | 25.7 | 22.7 | 24 | 27 | 22.7 |

Solvent Formulations F, G, and I were further investigated and evaluated as they had a lower required dwell time needed to accomplish fiber tear as the mode of failure as compared to the additive free Solvent Formulation A. In order to accomplish this, formulations A, F, G, and I were made and tested using a modified peel adhesion test according to a modified ASTM D 3330 method F. The modification included testing the peel strength after a 20 second dwell time and also testing the peel strength after a 40 second dwell time. Results are reported as the average force required to peel the label from the cardboard substrate in Table 10. All tests were performed using Adhesive Formulation A.

TABLE 10

Peel strength tests with dwell times of 20 and 40 seconds with various solvent formulations.

| | 20 Second Dwell | | | 40 Second Dwell | | |
|---|---|---|---|---|---|---|
| Solvent Formulation | Ave. (grams/ 25 mm$^2$) | σ | n | Ave. (grams/ 25 mm$^2$) | σ | n |
| A | 8.35 | 3.01 | 4 | 9.72 | 4.33 | 6 |
| F | 9.89 | 1.48 | 6 | 13.62 | 5.69 | 3 |
| G | 14.24 | 0.71 | 3 | 10.90 | 5.28 | 6 |
| I | 9.23 | 3.24 | 4 | 11.70 | 3.67 | 6 |

Additional experiments were conducted, using a similar method as above, to better understand the impact of different activation solvent formulations (Solvent Formulations A, F, G, and I) on different adhesive agent layer 496 formulations (Adhesive Formulations A, A1, A2, B1, B2, B3, B4, and B5 from Table 11). To accomplish this, the same modified peel adhesion test according to ASTM D 3330 method F as described above was employed. Results are reported as the average force required to peel the label from a cardboard substrate taken as the average over five tests. Solvent Formulations A, F, G, and I were each used to activate the solvent sensitive adhesive agent layer 496 of the solvent sensitive label 490 made with Adhesive Formulations A, A1, A2, B1, B2, B3, B4, or B5. Results are presented at the 20-second dwell time (Q) and the 40-second dwell time (L) in Table 12.

TABLE 11

| | Adhesive Formulation | | | | | | | |
|---|---|---|---|---|---|---|---|---|
| | A | A1 | A2 | B1 | B2 | B3 | B4 | B5 |
| | Percent Composition | | | | | | | |
| Poly(vinyl alcohol) (PVOH) (25% w-v in water) (Celvol ® 205) | 100% | 95.2% | 94.3% | 94.8% | 85.8% | 97.1% | 90.9% | 92.2% |
| Ethylene vinyl acetate (EVA) (55% w-v in water) (Vinnapas ® EP 400) | — | 4.8% | — | 2.4% | 6.4% | — | — | 2.3% |
| Water | — | — | — | 2.8% | 7.7% | — | — | 2.8% |
| Poly(acrylic acid) (25% w-v in water) (Carbosperse ™ K-702 Polyacrylate) | — | — | 5.7% | — | — | 2.9% | 9.1% | 2.8% |

TABLE 12

Peel tests results taken with various solvent and adhesive formulations. Results presented are the average of fives tests.
Peel tests were taken at both 20 seconds (Q) and 40 seconds (L).

| | | Peel Strength (grams/25 mm$^2$) Adhesive Formulation | | | | | | | | | | | | | | | |
|---|---|---|---|---|---|---|---|---|---|---|---|---|---|---|---|---|---|
| | | A | | A1 | | A2 | | B1 | | B2 | | B3 | | B4 | | B5 | |
| | | Q | L | Q | L | Q | L | Q | L | Q | L | Q | L | Q | L | Q | L |
| Solvent Formulation | Water (A) | 8.3 | 9.8 | 10.0 | 14.5 | 12.7 | 14.0 | 8.7 | 19.6 | 13.5 | 23.5 | 10.5 | 21.1 | 12.0 | 21.8 | 10.9 | 21.0 |
| | 3% n-Propanol (F) | 9.9 | 13.6 | 11.6 | 18.5 | 10.3 | 19.1 | 10.2 | 15.5 | 12.0 | 18.0 | 10.4 | 12.6 | 9.9 | 12.1 | 13.6 | 17.8 |
| | 1.5% n-propanol (G) | 14.3 | 10.9 | 10.3 | 19.2 | 9.1 | 15.2 | 9.6 | 16.7 | 8.0 | 22.3 | 8.5 | 15.4 | 15.2 | 18.5 | 8.9 | 18.2 |
| | IPA-n-propanol mix* (I) | 9.2 | 11.8 | 10.1 | 16.8 | 11.5 | 20.0 | 10.7 | 13.4 | 9.4 | 17.5 | 10.3 | 18.1 | 8.8 | 17.1 | 9.7 | 14.2 |

*1% isopropanol and 1.5% n-propanol in water
Q indicates the quick peel reading taken after 20 second dwell time
L indicates the reading taken after a 40 second dwell time The results summarized in Tables 9, 10, and 12 indicate that altering the activation solvent affects the adhesive behavior of the solvent-sensitive adhesive label 490. The results also suggest that the adhesive profile of the label 490 may be adjusted based on a selection of solvent and co-solvent blends. This is of significance commercially, as different applications require different adhesive profiles. For example, in certain applications, a weak initial peel strength followed by a curing period where the peel strength increases greatly may be preferred, such as that provided by a combination of Adhesive Formulation A2 and Solvent Formulation G. This would allow for misplaced labels to be corrected before a permanent adhesive bond is formed. Other applications, such as high throughput labeling applications where it is critical to apply labels to substrates that are quickly moving on an automated assembly, packaging, and/or sorting line, would benefit from a higher initial peel strength value such as that provided by Adhesive Formulation B4 and Solvent Formulation G.

Figure 10:
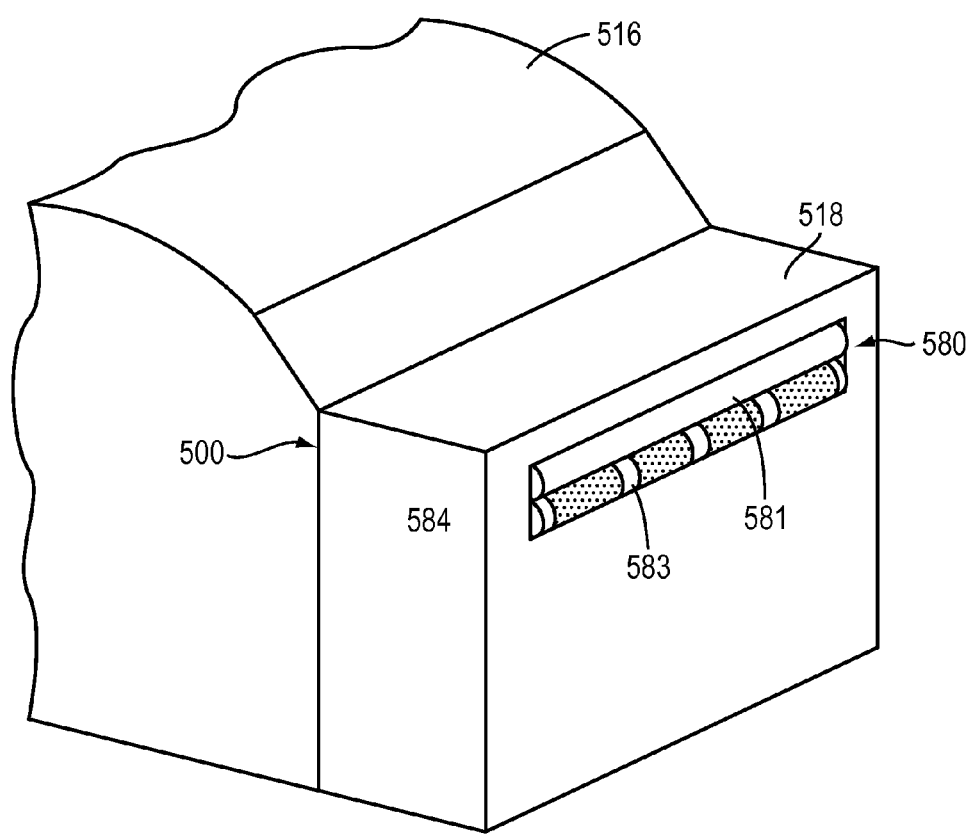
FIG. 10 is a schematic perspective partial view of an activator assembly attached to a printer in accordance with another embodiment of the invention.

FIG. 10 depicts another embodiment of an activator assembly 500. The activator assembly 500 is attached to an end of a label printer 516 and is aligned such that a label exiting the label printer 516 will enter the activator assembly 500. The activator assembly 500, as depicted in FIGS. 10 and 11, includes a housing 518, a label moving or support mechanism 580, a solvent containing device 503, a solvent reservoir 502, an activating element 512, a fan assembly 550, distribution doors 552, and a control system/circuit board 514.

The housing 518 is of a suitable size to contain all of the components of the activator assembly 500. The housing 518 is sufficiently wide for a solvent-sensitive adhesive sheet to pass through, such as about four to six inches in width. On one surface, the housing 518 forms an opening to house the moving mechanism 580. The moving mechanism 580 includes an upper roller 581 and a lower roller 583, thereby defining an exit slot 584 between them. The upper roller 581 and the lower roller 583 are sufficiently spaced apart to guide a solvent-sensitive adhesive sheet between them, such as about zero millimeters to one-tenth of one millimeter, through which a solvent-sensitive adhesive sheet may travel. The upper roller 581 and the lower roller 583 can be linked together by a gear assembly 585 (depicted in FIG. 13) to help ensure they turn at the same rate to guide a solvent-sensitive adhesive sheet through the activator assembly 500 and the exit slot 584. The exit slot 584 may be aligned with a slot on the label printer 516 or other equipment where a solvent-sensitive adhesive sheet may exit. Alternatively, this activator assembly 500 may be used in a standalone configuration. The activator assembly 500, the exit slot 584, the upper roller 581, and the lower roller 583 may be made of any sufficiently rigid and strong material such as high-strength plastic, metal, and the like.

Figure 11:
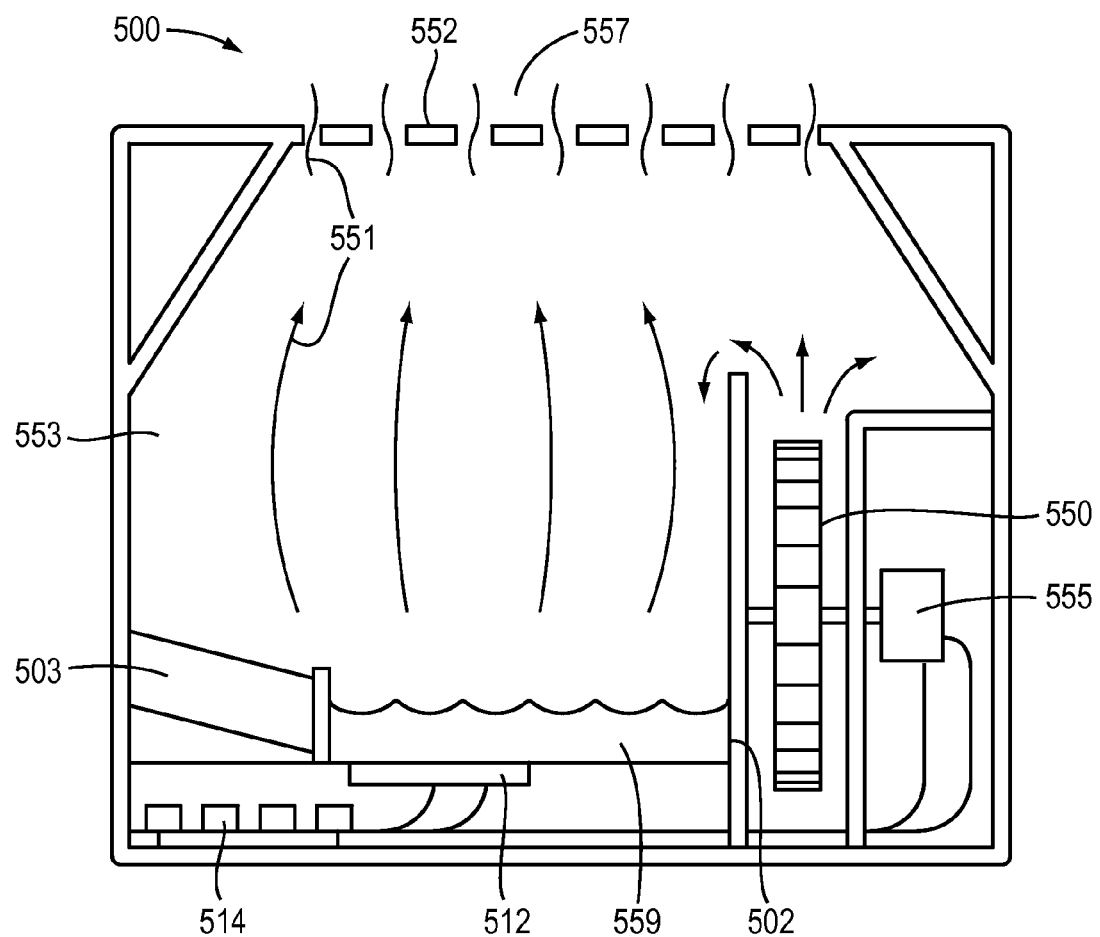
FIG. 11 is a schematic sectional view of the activator assembly depicted in FIG. 10, in accordance with another embodiment of the invention.

FIG. 11 depicts the internal components and configurations of the activator assembly 500 adapted to generate a solvent vapor/gas 551 for application to the adhesive layer of a label. The activating element 512 is located beneath the solvent reservoir 502. The activator assembly 500 also includes a vapor/gas reservoir 553 and a fan motor 555 connected to the fan 550. The pair of distribution doors 562 are located between the vapor/gas reservoir 553 and an activation site 557.

A solvent 559 is excited to the state of the vapor/gas 551 by the activating element 512, at which point the solvent 559 is suspended as the vapor/gas 551 in the vapor/gas reservoir 553. In various embodiments, the activating element 512 may be a heater element, a piezoelectric element, or other suitable device. The fan motor 555 drives the fan 550 to create an air current in the vapor/gas reservoir 553. The air current moves the vapor/gas 551 from the vapor/gas reservoir 553 through the pair of distribution doors 552 to the activation site 557. The circuit board 514 controls the activating element 512 and the fan motor 555. The circuit board 514 is connected to central electronics in the label printer 516, such that internal components of the label printer 516 can interact with the circuit board 514 and internal components of the activator assembly 500.

In further detail, still referring to FIG. 11, the solvent containing device 503 may supply ample volume of the solvent 559 to fill the solvent reservoir 502. The solvent reservoir 502 contains ample volume of the solvent 559 to render tacky a reasonably large area of adhesive on solvent-sensitive adhesive sheet. The activating element 512 operates at an intensity to excite the solvent 559 from a liquid state into the vapor/gas 551. The vapor/gas reservoir 553 should be of ample volume to contain a sufficient amount of the solvent 559 in the state of the vapor/gas 551 to render tacky a reasonably large area of adhesive on solvent-sensitive adhesive sheet. The fan motor 555 and the fan 550 move an ample volume of the vapor/gas 551 to the activation site 557. The pair of distribution doors 562 contain the vapor/gas 551 to the vapor/gas reservoir 553 when closed and allow an ample amount of the vapor/gas 551 to pass through to the activation site 557 when open. The circuit board 514 is sized to fit within the boundaries of the activator assembly 500, underneath the solvent reservoir 502, and underneath the activating element 512.

The solvent reservoir 502, the activating element 512, the vapor/gas reservoir 553, the fan motor 555, the fan 550, the distribution doors 552, the circuit board 514, and the solvent containing device 503 may be made of any sufficiently rigid and strong material such as high-strength plastic, metal, and the like. The solvent 559 consists of a material that, when in the state of the vapor/gas 551, is capable of rendering tacky the adhesive agent layer of the adhesive sheet. Further, the various components of the activator assembly 500 can be made of materials that do not degrade over time with exposure to the solvent 559 and the vapor/gas 553.

Figure 12A:
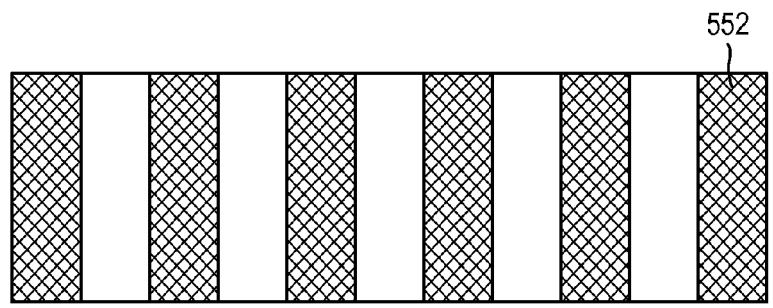
FIGS. 12A and 12B are schematic plan views of a pair of distribution doors in an open and a shut position in accordance with the activator assembly depicted in FIG. 10, in accordance with one embodiment of the invention.
Figure 12B:
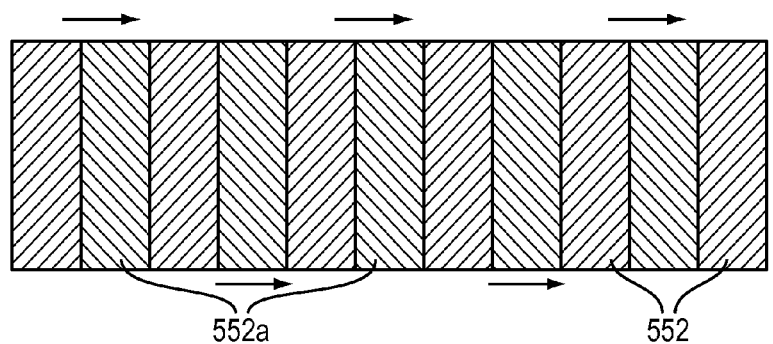

FIGS. 12A and 12B depict the pair of distribution doors 552 at the approximate time an adhesive sheet is fed thereby (FIG. 12A) and thereafter (FIG. 12B). The distribution doors 552 open and close. When the pair of distribution doors 552 are open, respective openings in the pair of distribution doors 552 align with each other to allow multiple channels for the vapor/gas 551 to pass through the distribution doors 552 from the vapor/gas reservoir 553 to the activation site 557. Once the sheet passes by, the pair of distribution doors 552 are closed by one door 552a sliding laterally so as to close all channels between the vapor/gas reservoir 553 and the activation site 557.

In further detail, still referring to FIGS. 12A and 12B, the pair of distribution doors 552 have identical slats of width of about 0.125 inches to 0.5 inches. Both doors 552 are of sufficient width to allow enough of the vapor/gas 551 to pass through to render tacky the entire width of the adhesive agent layer of the adhesive sheet. The overall width of the pair of distribution doors 552 may be about two to five inches and about 0.25 inches to 2.0 inches in length. The pair of distribution doors 552 may be made of any sufficiently rigid and strong material such as high-strength plastic, metal, or the like.

Figure 13:
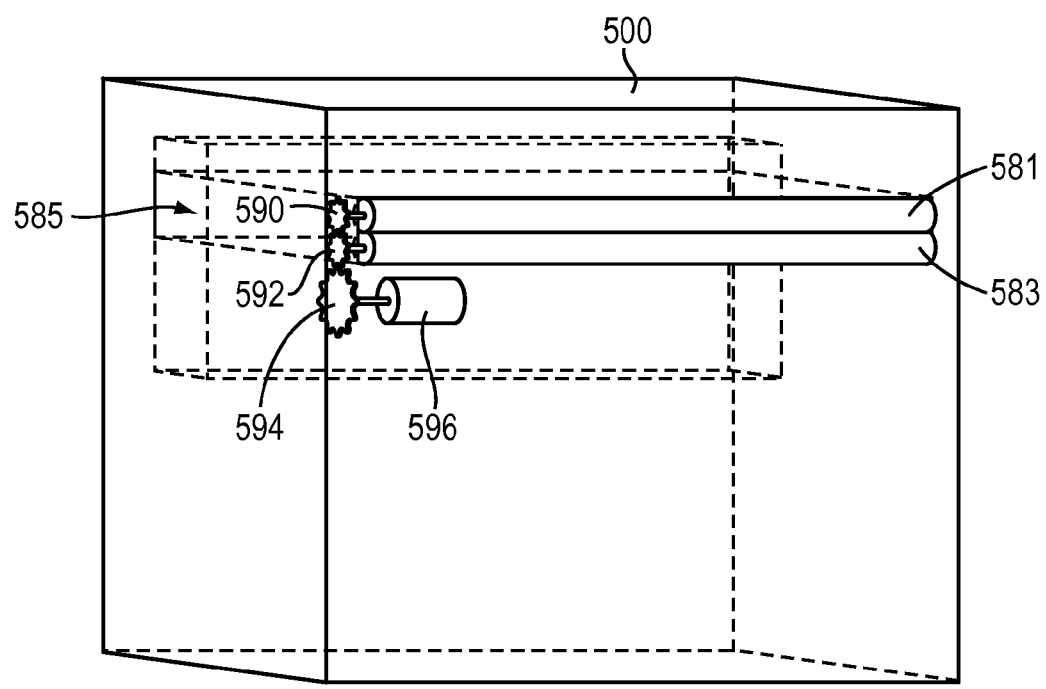
FIG. 13 is a schematic transparent isometric view of a gear assembly in the activator depicted in FIG. 10, in accordance with one embodiment of the invention.

FIG. 13 depicts the activator assembly 500 containing an upper gear 590, a lower gear 592, and a driving gear 594. The upper gear 590 is attached to the upper roller 581, and the lower gear 592 is attached to the lower roller 583. The driving gear 594 is attached to a driving motor 596. Finally, the driving motor 596 is connected to a secondary circuit board in the activator assembly 500.

In more detail, still referring to FIG. 13, the driving motor 596 is connected to the driving gear 594 within the activator assembly 500. The driving gear 594 meshes with the lower gear 592, which meshes with the upper gear 590. The lower gear 592 is connected on its axis to the lower roller 583. The upper gear 590 is connected on its axis to the upper roller 581. While the driving motor 596 is turning, the upper roller 581 and the lower roller 583 turn in opposite directions in such a way that a solvent-sensitive adhesive sheet will be guided through a slot of the activator assembly 500.

In further detail, still referring to the invention of FIG. 13, the upper roller 581 may be of a diameter of about 0.125 inches to 0.5 inches. The lower roller 583 may be similarly dimensioned. The upper gear 590 may be of a similar or equivalent diameter to that of the upper roller 581, and the lower gear 592 may be of a similar or equivalent diameter to that of the lower roller 583. The driving gear 594 may have a diameter of about 0.25 inches to 1.0 inch. The driving motor 596 should be of sufficient size to produce enough torque to guide the adhesive sheet through the activator assembly 500.

The activator assembly 500, the upper gear 590, the lower gear 592, the driving gear 594, the upper roller 581, the lower roller 583, and the driving motor 596 may be made of any sufficiently rigid and strong material such as high-strength plastic, metal, and the like. Further, the various components of the activator assembly can be made of different materials and may include rubber or silicone coatings.

Figure 14A:
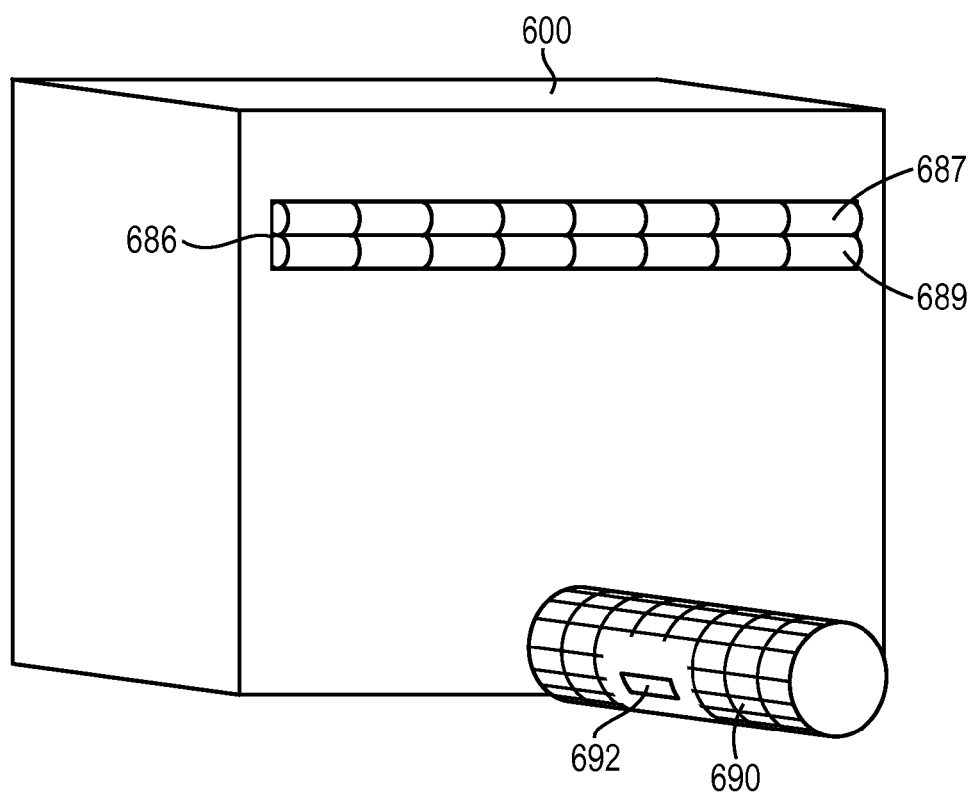
FIGS. 14A and 14B are front and rear schematic isometric views of an activator assembly in accordance with yet another embodiment of the invention.
Figure 14B:
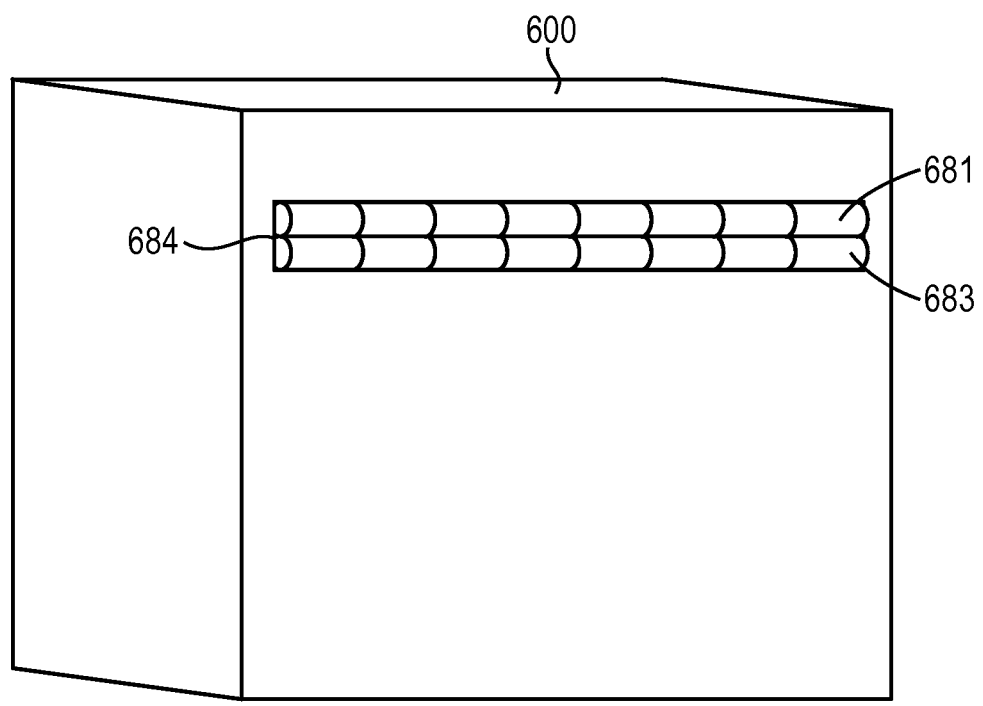

FIGS. 14A and 14B depict another embodiment of an activator assembly 600. The activator assembly 600 includes an entrance slot 686 that contains an entrance upper roller 687 and an entrance lower roller 689 driven by an entrance gear assembly (not shown). The activator assembly 600 also optionally includes an exit slot 684 that contains an exit upper roller 681, an exit lower roller 683, and an exit gear assembly (not shown). A handle 690 is attached to the activator assembly 600.

In more detail, still referring to FIGS. 14A and 14B, the adhesive sheet enters the activator assembly 600 via the entrance slot 684 and is guided by the entrance upper roller 687 and the entrance lower roller 689, which are linked by the entrance gear assembly, through the activator assembly 600 to the exit rollers 681, 683, and exit slot 684. The handle 690 enables the activator assembly 600 to be easily transported. A switch 692 located on the handle 690 communicates with a circuit board of the activator assembly 600. The switch 692 may be used to control the fan motor and the activating element within the activator assembly 600. The activator assembly 600 should remain generally horizontal during operation.

In further detail, still referring to FIGS. 14A and 14B, the activator assembly 600 is sufficiently wide for the solvent-sensitive adhesive sheet to pass therethrough, such as about four to six inches in width. The entrance rollers 687, 689 are sufficiently spaced apart for guiding the solvent-sensitive adhesive sheet between them, such as about zero millimeters to 0.1 mm. The entrance upper roller 687 may have a diameter of about 0.125 inches to 0.5 inches and the entrance lower roller 689 may have a similar diameter. Within the entrance gear assembly, an entrance upper gear may be of a similar or equivalent diameter of the entrance upper roller 687. Also, the entrance lower gear may be of a similar or equivalent diameter of the entrance lower roller 689. Within the activator assembly 600, the entrance upper roller 687 and the entrance lower roller 689 are linked together by the entrance gear assembly and rotate at a similar or equivalent rate to guide the solvent-sensitive adhesive sheet from the entrance slot 686 through the activator assembly 600.

The optional exit upper roller 681 and the optional exit lower roller 683 are sufficiently spaced apart for guiding the adhesive sheet between them, such as about zero millimeters to 0.1 mm. Within the activator assembly 600, the exit upper roller 681 and the exit lower roller 683 are linked together by an exit gear assembly and turn at a similar rate to guide the adhesive sheet out the exit slot 684. Within the exit gear assembly, an exit upper gear may be of a similar or equivalent diameter to that of the exit upper roller 681. Also, within the exit gear assembly, an exit lower gear may be of a similar or equivalent diameter to that of the exit lower roller 683. A driving gear may have a diameter of about 0.25 inches to 1.0 inch and may mesh with the entrance gear assembly and the exit gear assembly. A driving motor drives the driving gear. The driving motor is of sufficient size to produce enough torque to guide the adhesive sheet through the activator assembly 600. The handle 690 should be of a sufficient length and diameter so as to provide a means of supporting the weight and balance of the activator assembly 600, such as about three to seven inches in length and about 0.125 inches to 2.0 inches in diameter.

The activator assembly 600, the entrance slot 686, the entrance upper roller 687, the entrance lower roller 689, the entrance gear assembly, the exit slot 684, the exit upper roller 681, the exit lower roller 683, the exit gear assembly, the handle 690, and the switch 692 may be made of any sufficiently rigid and strong material such as high-strength plastic, metal, and the like. Further, the various components of the activator assembly 600 can be made of different materials.

Figure 15:
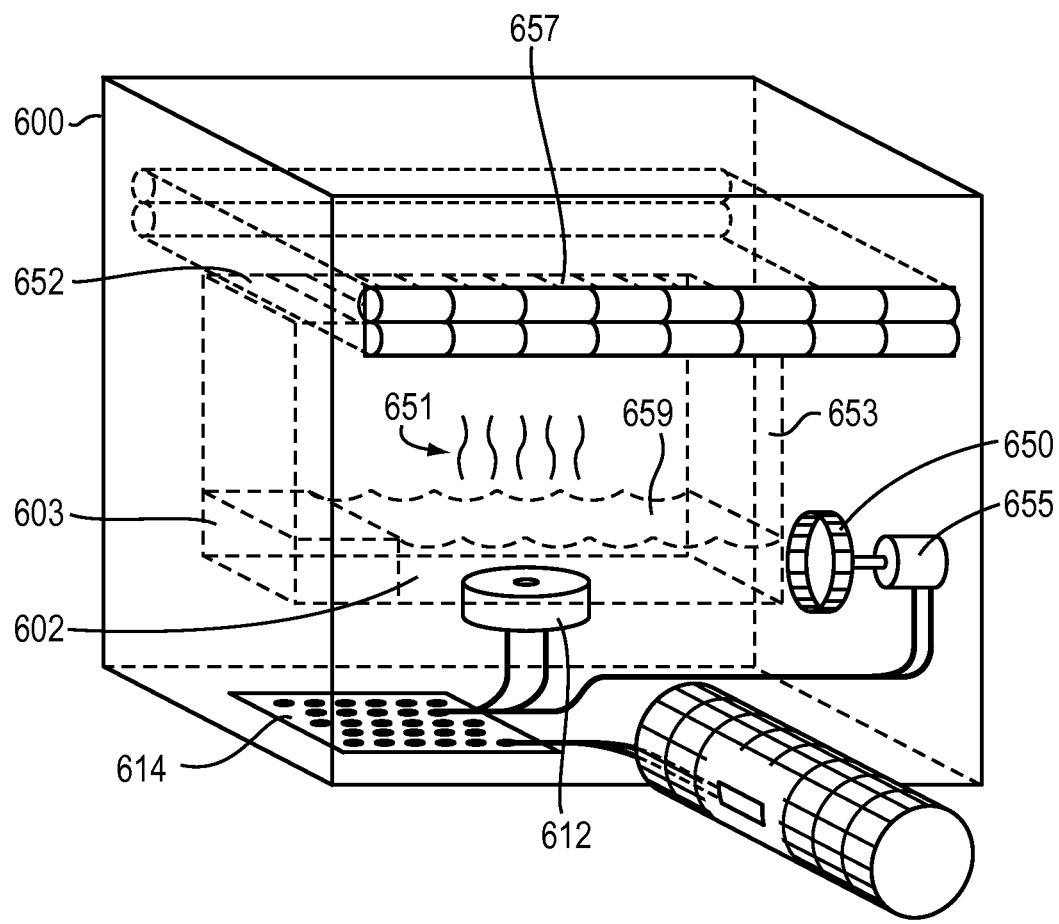
FIG. 15 is a schematic front transparent isometric view of the activator assembly depicted in FIGS. 14A and 14B, in accordance with one embodiment of the invention.

FIG. 15 depicts the internal configuration of components of the activator assembly 600 that contains a vapor/gas 651. The activator assembly 600 contains a solvent reservoir 602 configured for containing a solvent 659. An activating element 612 is located beneath the solvent reservoir 602. The activator assembly 600 further contains a vapor/gas reservoir 653 and a fan motor 655 connected to a fan 650. Between the vapor/gas reservoir 653 and an activation site 657 is a pair of distribution doors 652. The activator assembly 600 contains a control system/circuit board 614 and a solvent containing device 603.

In more detail, still referring to FIG. 15, the solvent 659 is placed in the solvent reservoir 602 contained within the activator assembly 600 such as, by way of, without limitation, the solvent containing device 603. The solvent containing device 603 is inserted into the activator assembly 600 to introduce the solvent 659 to the solvent reservoir 602. The solvent 659 is excited to the state of the vapor/gas 651 by the activating element 612, at which point the solvent 659 is suspended in the state of the vapor/gas 651 in the vapor/gas reservoir 653. The fan motor 655 drives the fan 650 to create an air current in the vapor/gas reservoir 653. The air current moves the vapor/gas 651 from the vapor/gas reservoir 653 through the pair of distribution doors 652 to the activation site 657. The circuit board 614 controls the activating element 612 and the fan motor 655. The circuit board 614 is disposed in the activator assembly 600 and is connected to central electronics in a label printer, such that, the fan motor 655, the activating element 612, and the pair of distribution doors 652 can be controlled effectively by the circuit board 614.

In further detail, still referring to FIG. 15, the solvent containing device 603 should supply ample volume of the solvent 659 to fill the solvent reservoir 602 and to render tacky a reasonably large area of adhesive on a solvent-sensitive adhesive sheet. The activating element 612 operates at an intensity to excite the solvent 659 from a liquid state into the vapor/gas 651. The vapor/gas reservoir 653 should be of sufficient volume to contain a reasonable amount of the solvent 659 in the state of the vapor/gas 651 to render tacky a reasonably large area of adhesive on the solvent-sensitive adhesive sheet. The fan motor 655 and the fan 650 move an ample volume of the vapor/gas 651 to the activation site 657. The pair of distribution doors 652 contain the vapor/gas 651 in a vapor/gas reservoir 653 when closed and allow an ample amount of the vapor/gas 651 to pass through to the activation site 657 when open. The circuit board 614 is sized to fit within the boundaries of the activator assembly 600, underneath the solvent reservoir 602, and underneath the activating element 612.

The activator assembly 600, the solvent reservoir 602, the activating element 612, the vapor/gas reservoir 653, the fan motor 655, the fan 650, the pair of distribution doors 652, the circuit board 614, and the solvent containing device 603 may be made of any sufficiently rigid and strong material such as high-strength plastic, metal, and the like. The solvent 659 consists of a material that, as a vapor/gas 651, is capable of rendering tacky the adhesive agent layer of the adhesive sheet. Further, the various components of the activator assembly 600 can be made of different materials that are resistant over time to exposure to the solvent 659 and the vapor/gas 651.

In operation, the adhesive sheet is guided to the activation site 657 in the activator assembly 600 for solvent activation. At the activation site 657, the adhesive agent layer (such as the layer 496 depicted in FIG. 9) is rendered tacky by exposure to the solvent vapor/gas 651 from the vapor/gas reservoir 653, through the pair of distribution doors 652. The activated solvent-sensitive adhesive sheet is then guided through an exit slot of the activator assembly 600.

Figure 16A:
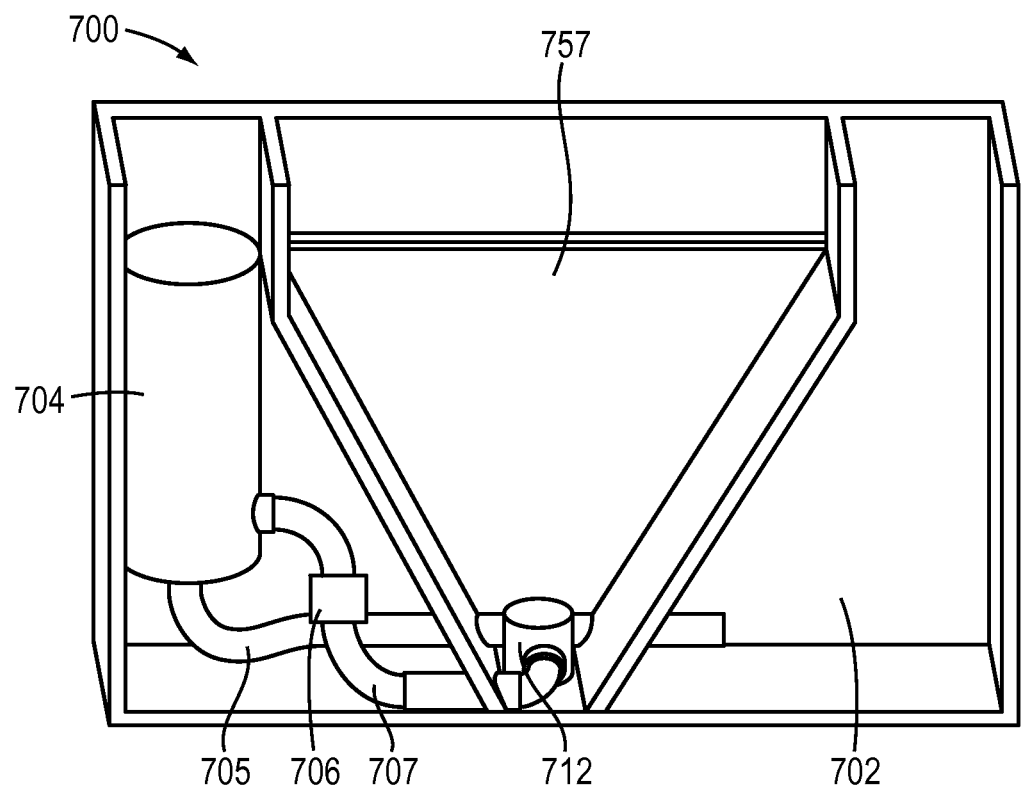
FIG. 16A is a schematic sectional view of an activator assembly in accordance with still another embodiment of the invention.
Figure 16B:
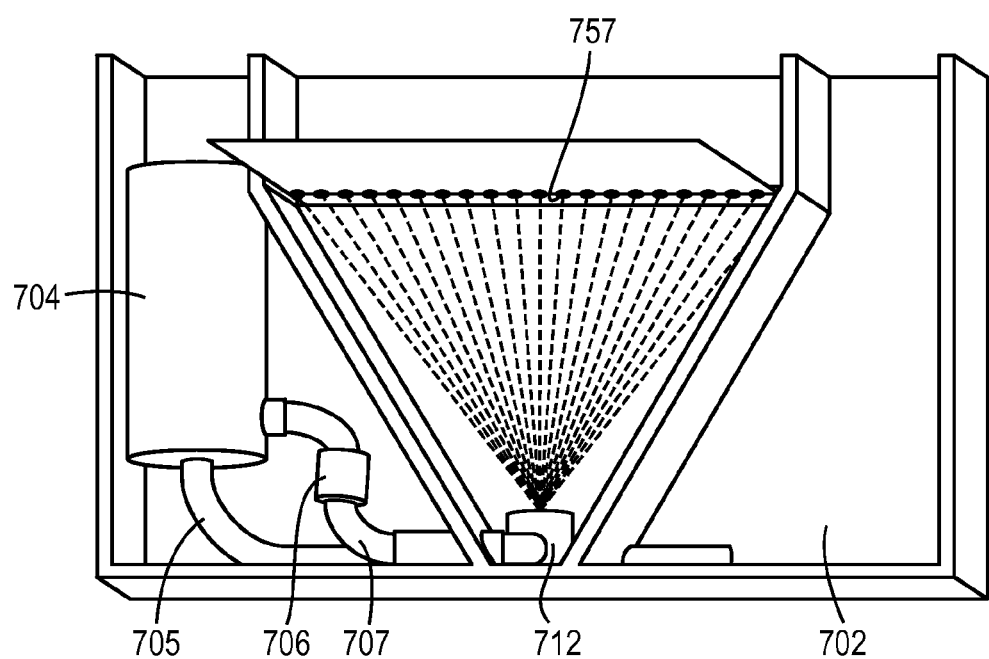
FIG. 16B is a schematic sectional view of the activator assembly depicted in FIG. 16A activating a label, in accordance with one embodiment of the invention.

FIGS. 16A and 16B depict another embodiment of an activator assembly 700. The activator assembly 700 includes a solvent reservoir 702, a pump 704, a feeding tube 705, a check valve 706, a pressure tube 707, a nozzle 712, and an activation site 757.

The solvent reservoir 702 holds a liquid solvent (such as any of those previously discussed). The reservoir 702 may be substantially liquid-tight, and have a capacity equal to or more than the amount of liquid solvent required to activate one roll of liquid solvent-sensitive adhesive liner-free label. In one embodiment, the reservoir 702 is integrally formed within a housing of the activator assembly 700, though a separate permanently mounted container or replaceable reservoir cartridge could be used.

The pump 704 pressurizes solvent drawn from the reservoir 702. In one embodiment, the pump 704 may be of the type used for pressurizing windshield washer fluid in a vehicle. The pump 704 may be connected to and packaged with a single DC motor as an integral assembly. One embodiment utilizes a direct current motor that operates with a potential difference of around 6 to 30 volts DC. The embodiment depicted in FIGS. 16A and 16B has a DC motor included in a same housing as the pump 704. Some alternative embodiments include a single DC motor that drives a separate pump or multiple separate pumps that is/are connected by either a mechanical or magnetic interface or other suitable arrangement. Another embodiment includes several pumps and has several motors to drive each pump individually.

Various embodiments of the activator assembly 700 include one or several self-priming or non-self-priming centrifugal pumps. Another embodiment includes one or several flexible impeller pumps. Yet another embodiment includes one or several positive displacement pumps. The reservoir 702 is selected/designed to have a sufficient capacity, so that one full reservoir or cartridge of liquid solvent will activate at least one roll of labels.

The feeding tube 703 draws fluid from the solvent reservoir 702 to an inlet of the pump 704. In one embodiment a rubber/plastic tube having a nominal inner diameter of about 0.25 inches may be used, such as air line tubing intended for use in fish tank filtration systems. Once pressurized by the pump 704, high pressure fluid solvent passes through the check valve 706.

The check valve 706 prevents a flow of liquid solvent in the system from travelling in a reverse direction. In some scenarios with differing solvent fluid (e.g., water) levels and pressures, the check valve 706 only allows liquid to flow in the intended direction. One embodiment uses a check valve 706 typically used in an air line of a fish tank filtration system.

The pressure tube 707 transports high pressure liquid solvent from the check valve 706 to the spray nozzle(s) 712. The pressure tube 707 may be similar to the feeding tube 705 in material and configuration.

The nozzle 712 dispenses high-pressure liquid solvent as a mist or as a vapor. One embodiment uses a single nozzle, similar to the type used in a manual trigger-spray bottle, to produce a generally conical spray pattern. Other embodiments use a precision nozzle that sprays in a flat fan pattern. Still other embodiments include multiple nozzles 712 that receive pressurized liquid from either one or multiple pumps 704.

The activation site 757, though not a physical component, is important to the functionality and reliable operation of the invention based on its size and orientation. The activation site 757 is the physical location where liquid solvent (e.g., in mist or vapor form) comes into contact with the dormant polymer adhesive layer on a back of a liquid solvent-sensitive adhesive liner-free label. The activation site 757 is located a sufficient distance away from the nozzle 712, allowing the solvent mist or vapor fan or other spray pattern to disperse to activate an entire width of the dormant polymer adhesive layer on the back of the liquid solvent-sensitive adhesive liner-free label.

In one embodiment, the activator assembly 700 is designed to work autonomously, as a retrofit to current label printers. In one embodiment, the only control input required to turn the apparatus on and off is the supply of DC current to the motor(s). When current is supplied, the pump(s) 704 pressurize(s) the activator assembly 700 and a liquid solvent is ejected from the nozzle(s) 712 and delivered to the activation site 757. In one embodiment, an electrical current signal to the motor is governed by a printed circuit board that interfaces with a control output available on an attached printer of the type to control accessories, such as automatic cutters, rewinders, etc. The pump(s) 704 is turned on as a label is printed and passes over the activation site 757. The pump 704 is turned off after the label passes through the activation site 757 and activation is complete. Power to run the motor and the pump 704, as well as the control, can be integral with the activator assembly 700 (e.g., a battery or plug and transformer to accept line voltage) or can be provided by an attached printer with a suitable electrical cable.

The activator assembly 700 is adapted to integrate with label printers, and adds an additional set of actions that occurs at the end of the printing process. The activator assembly 700 is intended to be retrofit to the label dispensing end of any printer, though it may also be attached to alternative devices, such as a label applicator. The process in the activator assembly 700 can follow after (in order) the imaging process and the automatic label cutting process.

In operation, the activator assembly 700 adds additional steps to the printing process. Processes that would normally occur in a label printer without an activation apparatus are initial steps 1-3 and 7-8 inclusive, and processes that are performed as a result of the inclusion of the attached invention to the printer include steps 4-6 and 9 (including sub-steps).

First, a printer is sent a command, and outline, for a printed label from a computer. Second, the printer begins to print a label, the printhead creating an image on the top of the label and the platen driving the label forward and out of the printer. Third, the lead edge of the printed label passes through a cutter.

Fourth, a lead edge of the printed label enters the activator assembly 700. Fifth, as the lead edge enters the activation apparatus, the following activation process is initiated: the printer sends an electronic signal to a printed circuit board of the activator assembly 700 to begin the activation process; the printed circuit board of the activator assembly 700 begins to supply electricity to the pump 704; when supplied with electricity, the pump 704 turns on and begins to pressurize solvent; as the system becomes pressurized, solvent is forced from the nozzle 712; while solvent within the activator assembly 700 is being ejected, the pump 704 continuously draws new solvent to be pressurized from the solvent reservoir 702; as solvent is forced from the nozzle 712, its spray pattern is dictated by a shape and size of the aperture of the nozzle 712 (the nozzle 712 is selected to distribute solvent in a mist/vapor form to the entire activation site 757, which may be the width of a variable label and the bounds of which the distribution of a solvent spray in a mist/vapor form should not exceed); a spray area governed by the nozzle 712 creates the activation site 757 (a controlled, closed system within the activator assembly 700) where the label can be activated and rendered ready for use. Sixth, as the activator assembly 700 has been turned on, the printed label becomes activated as it is driven through the activation site 757 by the printer. The combination of drive speed, system pressure, and nozzle shape are optimized, such that a uniform supply of solvent is delivered across the entire label in an appropriate volume to effectively activate the label's adhesive.

Seventh, as the label printing process is finishing, a trailing edge of the printed label passes through the cutter, at which time it is cut and separated from an unprinted label stock roll. Eighth, after the label is cut from the label stock roll, the operator can remove the label from the printer. Ninth, as the label is removed, the trailing edge passes through the activator assembly 700. Once the trailing edge has left the activator assembly 700, the activation process is complete. The printed circuit board ceases to supply electricity to the pump 704, the activator assembly 700 ceases to have pressure, and solvent ceases to be forced from the nozzle 712. The activator assembly 700 is turned off.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The compositions, components, and functions can be combined in various combinations and permutations, to achieve a desired result. For example, all materials for components (including materials not necessarily previously described) that are suitable for the application are considered within the scope of the invention. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

The invention claimed is:

1. A label printing and activation system, said system comprising:
   a label printer selected from the group consisting of a thermal printer, an ink jet printer, and a laser printer;
   one or more sensors for detecting a liner-free label; and
   a control system configured to control a cutter and a label activator in response to receiving signals from the one or more sensors, wherein:
   the cutter is positioned subsequent to the label printer in a path that the liner-free label travels through the label printing and activation system, the cutter being configured to sever the liner-free label from a label material; and
   the label activator is positioned subsequent to the cutter in the path that the liner-free label travels through the label printing and activation system, the label activator comprising:
   a fluid containing device;
   a fluid reservoir that receives a fluid supplied from the fluid-containing device;

an activating element that excites the fluid in the fluid reservoir;
a conduit in which the excited fluid is suspended, the conduit including a distribution door; and
a fan that conveys the excited fluid in the conduit through the distribution door;
wherein in response to receiving signals from the one or more sensors, said control system controls the cutter, the fan, and the activating element to:
cause the activating element to excite the fluid in the fluid reservoir;
after exciting the fluid in the fluid reservoir, cause the fan to apply the excited fluid to a first portion of a surface of the liner-free label prior to the liner-free label being severed from the label material by the cutter;
after applying the excited fluid to the first portion of the surface of the liner-free label, cause the cutter to sever the liner-free label from the label material; and
after severing the liner-free label from the label material, cause the fan to apply the excited fluid to a second, trailing edge portion of the surface of the liner-free label.

2. The label printing and activation system according to claim 1 wherein the liner-free label is movable with respect to the fan to enable the excited fluid to substantially wet the surface of the liner-free label.

3. The label printing and activation system according to claim 1 wherein the fan is selectively activated for successive ones of the liner-free label.

4. The label printing and activation system according to claim 1 wherein the control system opens or closes the distribution door to control the conveyance of the excited fluid from the conduit through the distribution door.

5. The label printing and activation system according to claim 4 further comprising one or more sensors for detecting a liner-free label, wherein the control system is responsive to said one or more sensors to control the opening and closing of the distribution door to enable the fan to apply the excited fluid to activate the first portion of the surface of the liner-free label to become adhesive.

6. The label printing and activation system according to claim 5 wherein the control system calculates a time-delay in response to detecting the liner-free label and, after the time-delay elapses, enables the fan to apply the excited fluid to activate the first portion of the surface of the liner-free label to become adhesive as the label passes by the distribution door.

7. The label printing and activation system according to claim 1 further comprising a housing of the label activator, the housing having a pair of openings characterizing a start and end of a path along which the liner-free label travels through the label activator and passes by the distribution door.

8. The label printing and activation system according to claim 1 further comprising a housing of the label activator, the housing having at least a pair of openings representing a start and end of a path along which the liner-free label travels through the label activator, and the distribution door is disposed along said path to allow the fan to apply the excited fluid to the first portion of the surface of the liner-free label as the liner-free label passes by the distribution door along said path.

9. The label printing and activation system according to claim 8 wherein when the liner-free label is received in said one of openings representing the start of said path, the liner-free label is separate from any other ones of said liner-free labels.

10. The label printing and activation system according to claim 1 wherein the distribution door is operated in accordance with a signal externally provided to the label activator.

11. The label printing and activation system according to claim 1 wherein the distribution door is disposed along a path along which the liner-free label travels to enable the distribution door to allow the fan to apply the excited fluid to the surface of the liner-free label and the distribution door is operated in accordance with at least movement or speed of the liner-free label along said path.

12. The label printing and activation system according to claim 1 wherein the distribution door is disposed along a path along which the liner-free label travels to enable the distribution door to allow the fan to apply the excited fluid to the surface of the liner-free label, and the distribution door is operated in accordance with at least location of the liner-free label along said path.

13. A label activator configured to be joined to a printer, the applicator comprising:
a fluid containing device;
a fluid reservoir that receives a fluid supplied from the fluid-containing device;
an activating element that excites the fluid in the fluid reservoir;
one or more sensors for detecting a liner-free label; and
a control system configured to control a cutter and a label activator, wherein the label activator comprises:
a conduit in which the excited fluid is suspended, the conduit including a distribution door; and
a fan that conveys the excited fluid in the conduit through the distribution door;
a housing enclosing at least the activating element, the fan, and the conduit, and the housing including a pair of openings characterizing a start and end of a path along which the liner-free label travels through the label activator and passes by the distribution door, the end of the path configured to align with a slot on the printer;
wherein in response to receiving signals from the one or more sensors, said control system controls the cutter, the fan, and the activating element to:
cause the activating element to excite the fluid in the fluid reservoir;
after exciting the fluid in the fluid reservoir, cause the fan to apply the excited fluid to a portion of a surface of the liner-free label prior to the liner-free label being severed from the label material,
after applying the excited fluid to the first portion of the surface of the liner-free label, cause the cutter to sever the liner-free label from the label material, and
cause the fan to apply the excited fluid to a second, trailing edge portion of the surface of the liner-free label after severing the liner-free label from the label material.

14. A label printing and activation system, the system comprising:
a label printer selected from the group consisting of a thermal printer, an ink jet printer, and a laser printer;
one or more sensors for detecting a label-free liner; and
a control system configured to control a cutter and a label activator, wherein the label activator comprises:
a label activator positioned subsequent to the label printer in a path along which a liner-free label travels through the label printing and activation system comprising:
a fluid containing device;
a fluid reservoir that receives a fluid supplied from the fluid-containing device;
an activating element that excites the fluid in the fluid reservoir;

a conduit in which the excited fluid is suspended, the conduit including a distribution door; and
a fan that conveys the excited fluid in the conduit through the distribution door;
a housing enclosing at least the conduit and the fan, the housing including a pair of openings characterizing a start and end of the path along which the liner-free label travels through the apparatus and passes by the applicator,
wherein in response to receiving signals from the one or more sensors, said control system controls opening and closing of the distribution door to enable the fan to apply excited fluid sufficient to activate a layer of material of the liner-free label to become adhesive and controls the cutter, the fan, and the activating element to:
  cause the activating element to excite the fluid in the fluid reservoir;
  after exciting the fluid in the fluid reservoir, cause the fan to apply the excited fluid to a portion of a surface of the liner-free label prior to the liner-free label being severed from the label material,
  after applying the excited fluid to the first portion of the surface of the liner-free label, cause the cutter to sever the liner-free label from the label material, and
  cause the applicator to apply the excited fluid to a second, trailing edge portion of the surface of the liner-free label after severing the liner-free label from the label material.

15. A label activator configured to be joined to a printer, the applicator comprising:
a fluid-containing device;
a fluid reservoir that receives a fluid supplied from the fluid-containing device;
an activating element that excites the fluid in the fluid reservoir;
one or more sensors for detecting a liner-free label; and
a control system configured to control a cutter and a label activator, wherein the label activator comprises:
  a conduit in which the excited fluid is suspended, the conduit including a distribution door; and
  a fan that conveys the excited fluid in the conduit through the distribution door;
a housing enclosing at least the conduit, the activating element, and the fan the housing including:
  a pair of openings characterizing a start and end of a path along which the liner-free label travels through the label activator and passes by the distribution door; and
  a moving mechanism configured to connect the housing to the printer,
wherein in response to receiving signals from the one or more sensors, said control system controls the cutter, the fan, and the activating element to:
  cause the activating element to excite the fluid in the fluid reservoir;
  after exciting the fluid in the fluid reservoir, cause the fan to apply the excited fluid to a portion of a surface of the liner-free label prior to the liner-free label being severed from the label material,
  after applying the excited fluid to the first portion of the surface of the liner-free label, initiate a firing of the cutter such that the liner-free label is severed from the label material, and
  cause the fan to apply the excited fluid to a second, trailing edge portion of the surface of the liner-free label after initiating after initiating the firing of the cutter to sever the liner-free label from the label material.

* * * * *